United States Patent
Law et al.

(10) Patent No.: US 8,340,790 B2
(45) Date of Patent: Dec. 25, 2012

(54) METHODS AND APPARATUS TO ADJUST CONTROL LOOP TIMING IN A PROCESS CONTROL SYSTEM

(75) Inventors: Gary Keith Law, Georgetown, TX (US);
Marty James Lewis, Cedar Park, TX (US); Godfrey Roland Sherriff, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 262 days.

(21) Appl. No.: 12/551,181

(22) Filed: Aug. 31, 2009

(65) Prior Publication Data
US 2011/0054640 A1 Mar. 3, 2011

(51) Int. Cl.
*H03K 3/017* (2006.01)
*G06F 19/00* (2011.01)

(52) U.S. Cl. ............... 700/54; 700/14; 700/70; 700/78; 370/350; 327/67; 327/155

(58) Field of Classification Search ............... 700/14, 700/54, 70, 78; 370/350; 327/67, 155
See application file for complete search history.

(56) References Cited

U.S. PATENT DOCUMENTS

| | | | |
|---|---|---|---|
| 4,868,430 A | 9/1989 | Stewart | |
| 5,153,807 A | 10/1992 | Saito et al. | |
| 6,294,937 B1 | 9/2001 | Crafts et al. | |
| 6,738,608 B2 * | 5/2004 | Black et al. | 455/260 |
| 6,864,833 B2 * | 3/2005 | Lyon | 342/124 |
| 7,114,091 B2 * | 9/2006 | Vrancic | 713/400 |
| 7,230,464 B2 * | 6/2007 | Rashid | 327/175 |
| 7,263,090 B2 * | 8/2007 | Cronin et al. | 370/350 |
| 7,325,171 B2 * | 1/2008 | Castro | 714/56 |
| 2003/0103486 A1 * | 6/2003 | Salt et al. | 370/350 |
| 2003/0186666 A1 * | 10/2003 | Sindhushayana | 455/260 |
| 2005/0285642 A1 * | 12/2005 | Rashid | 327/158 |

* cited by examiner

*Primary Examiner* — Michael D Masinick
(74) *Attorney, Agent, or Firm* — Hanley, Flight & Zimmerman, LLC

(57) ABSTRACT

Example methods and apparatus to adjust control loop timing in a process control system are disclosed. A disclosed example method includes receiving a first input signal generated via a first process control device within a process control system, determining within the process control system if the first input signal is received during a first scheduled time period of a control loop, and adjusting within the process control system a timing of a subsequent input signal received from the first process control device to cause the subsequent input signal to be received during a subsequent scheduled time period of the control loop, wherein the timing of the subsequent input signal is based on at least when the first input signal was received.

33 Claims, 10 Drawing Sheets

METHODS AND APPARATUS TO ADJUST CONTROL LOOP TIMING IN A PROCESS CONTROL SYSTEM

FIELD OF THE DISCLOSURE

The present disclosure relates generally to process control systems and, more particularly, to methods and apparatus to adjust control loop timing in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over buses or other communication lines to the field devices to control the operation of the process.

A typical process control system is segmented into one or more control loops that are operated by a process controller. Each control loop includes a number of inputs from one or more field devices, a control algorithm, and one or more outputs. Each of these field devices is typically coupled to the process controller via one or more I/O cards and a respective communication path (e.g., a two-wire cable, a wireless link, or an optical fiber). The I/O cards receive inputs from the field devices and forward the inputs to the process controller. The quality of any particular control loop is determined by the ability of the control loop to read an input change in a timely manner, perform necessary control calculations, and generate a response in the form of an output signal. The output signal is transmitted to field devices within the process control system via the I/O cards. In some cases, the communication path may delay an input signal from being received in a timely manner by the process controller.

SUMMARY

Example methods and apparatus to adjust control loop timing in a process control system are described. A disclosed example method includes receiving a first input signal generated via a first process control device within a process control system and determining within the process control system if the first input signal is received during a first scheduled time period of a control loop. The example method further includes adjusting within the process control system a timing of a subsequent input signal received from the first process control device to cause the subsequent input signal to be received during a subsequent scheduled time period of the control loop, wherein the timing of the subsequent input signal is based on at least when the first input signal was received.

A disclosed example apparatus includes a scheduler to determine if a first input signal originating from a first process control device is received during a first scheduled time period of a control loop and adjust within the process control system a timing of a subsequent input signal received from the first process control device to cause the subsequent input signal to be received during a subsequent scheduled time period of the control loop, wherein the timing of the subsequent input signal is based on at least when the first input signal was received.

DETAILED DESCRIPTION

Figure 1:
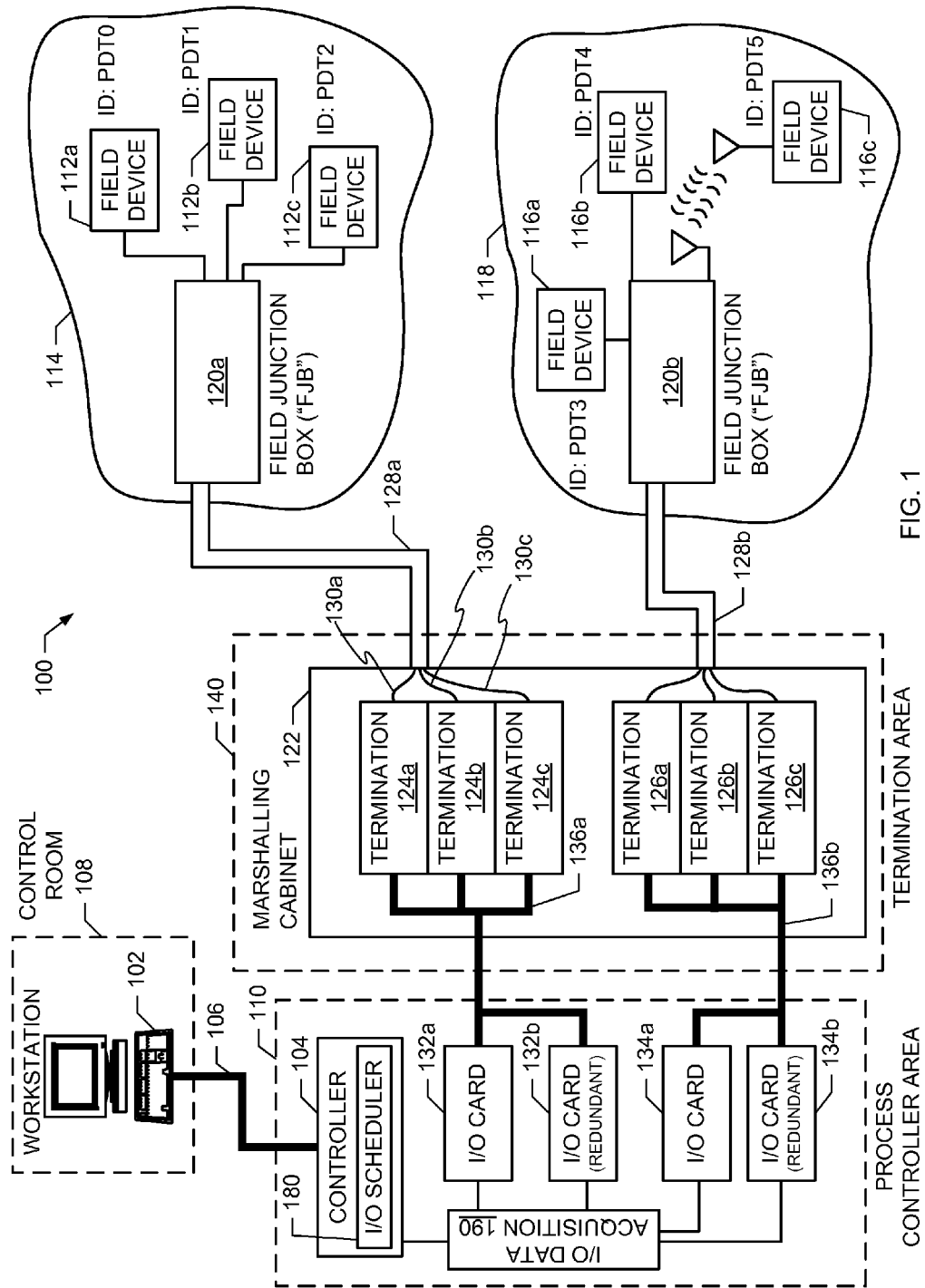
FIG. 1 is a block diagram illustrating an example process control system.

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, the examples provided are not the only way to implement such methods and apparatus.

Modern process control systems are inherently complex due to the many components involved including field devices, wiring, communication networks, Input/Output (I/O) acquisition devices, controllers (e.g., process controllers), central processors, I/O cards, etc. The field devices, which may include device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A controller receives signals (e.g., input signals) indicative of process measurements made by the field devices and/or other information pertaining to the field devices, uses this information to implement a control routine, and generates control signals (e.g., output signals) that are sent over the buses or other communication lines to the field devices to control the operation of the process. A single process control system may include one or more controllers, with each controller operating one or more control routines. A control routine comprises a control loop that is repeated at predetermined intervals. Each interval is a control loop cycle. For example, a control routine may include a control loop with a duration of 100 milliseconds (ms). Upon finishing a control loop cycle after 100 ms, the routine starts the next control loop cycle (i.e., repeats the operations of the control loop).

The methodology for creating a well-performing control loop can be a trial and error process that may be influenced by the topology of the process control system and/or the particular types and characteristics of the components implemented with the process control system. Additionally, a quality and/or a response of a control loop may be influenced by the ability of the control loop to read an input change generated by a monitoring field device in a timely manner, perform the necessary control calculations within the control loop, and generate outputs to corresponding control field devices.

Some known process control systems have issues with control loops responding in a timely manner to an input change. Prior to a control loop utilizing an input from a field device, typical process control systems are designed such that the input signal travels through several hardware devices and/or software layers within each hardware device. Each of the hardware devices and/or software layers adds some delay to the transmission time (e.g., latency) of the input signal. Additionally, the transmission delay increases as the number of hardware devices and/or software layers increases.

Furthermore, transmission delays may be introduced due to dynamic network loading within the process control system and/or by variability in I/O software modules. Dynamic network loading and/or variability in the software may delay an input value to a control loop and/or cause a significant delay in the transmission of the input value. This has the effect of providing old data to the control loop, which may result in an incorrect corrective action that can cause an unreliable or poorly tuned control loop.

Additionally, transmission delays may result from the addition of new process control equipment (e.g., field devices) for plant expansion or modification. As new hardware is added to a control loop, the dynamics of the process control system change. Also, software changes due to new features and/or bug corrections may alter the dynamics of the process control system. The changes to the dynamics of the process control system result in an unintended modification of control loop timing as the timing of received inputs deviates from predetermined process control schedules.

A typical solution for compensating for transmission delays involves oversampling input signals. For example some control loops are configured to run at a rate that is twice to four times slower than a fixed scan rate of an I/O acquisition device. However, this approach is limiting because the I/O acquisition device has a maximum throughput. Furthermore, the field devices are typically sampled in a sequential fashion (e.g., using sequential addresses) without any regard to the consumers (e.g., the field devices, controllers, etc.) using the input signals and the output signals. Moreover, this approach does not enable timing adjustments to cause the input signals arrive prior to the control loop calculating a corresponding control action.

The example methods and apparatus described herein provide an automatic adjustment to input signals so that they are received within an acceptable scheduled time period prior to their use within a process control loop. For example, the example methods and apparatus described herein may be used to identify that input signals from a thermometer (e.g., a field device) are not being received by a controller within a predefined (e.g., scheduled) time period prior to a control loop calculating a corresponding control action. This scheduled time period may be defined, for example, as 100-200 ms before the control loop utilizes the input signals. Upon identifying the input signals as not being received in a timely manner, the example methods and apparatus may be used to adjust the timing of the temperature input signals to ensure the input signals are received within the allowable or desired period of time (e.g., 100-200 ms) prior to the control loop calculating the corresponding control action.

In the example methods and apparatus described herein, a controller operates a control loop and identifies input signals from field devices that are not received within a predefined time period. The predefined time period corresponds to a time before a scheduled time at which a control loop utilizes the input signals. The predefined time period may be a tolerance (e.g., threshold) of a control loop that is dependent on an execution rate (e.g., a scan rate and/or loop cycle) of the control loop. In some examples, a control loop may have a tolerance for a loop scan that is 10% of a total time to execute one loop cycle. In this example, a 6 ms deviation may be within a tolerance of 10 ms for a control loop that has a loop cycle of 100 ms. However, a 60 ms deviation would exceed the tolerance of 10 ms. The input signals received by the controller originate from field devices and propagate through field junction boxes (FJBs), marshalling cabinets, I/O cards, and/or I/O data acquisition modules. The controller controls the timing of received inputs by sending a timing adjustment message to an I/O data acquisition module identifying which input signals to forward to the controller at which times. In response to receiving the timing adjustment message, the I/O data acquisition module adjusts the times at which it requests input signals from a corresponding field device and/or times it forwards input signals to the controller.

In FIG. 1, an example process control system 100 includes a workstation 102 communicatively coupled to a controller 104 via a bus or local area network (LAN) 106, which is commonly referred to as an Area Control Network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.).

The example controller 104 may be configured to perform one or more process control routines and/or functions operating as one or more control loops that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108. The example controller 104 includes an I/O scheduler 180 to manage the timing of input signals and/or output signals generated within the process control system 100.

In the illustrated example, the example process control system 100 includes field devices 112a-c in a first process area 114 and field devices 116a-c in a second process control area 118. To communicate information between the controller 104 and the field devices 112*a-c* and 116*a-c*, the example process control system 100 is provided with field junction boxes (FJB's) 120*a-b* and a marshalling cabinet 122. Each of the field junction boxes 120*a-b* routes signals from respective ones of the field devices 112*a-c* and 116*a-c* to the marshalling cabinet 122. The marshalling cabinet 122, in turn, marshals (e.g., organizes, groups, etc) information received from field devices 112*a-c* and 116*a-c* and routes the field device information to respective I/O cards (e.g., I/O cards 132*a-b* and 134*a-b*) of the controller 104. In the illustrated example, the communications between the controller 104 and the field devices 112*a-c* and 116*a-c* are bidirectional so that the marshalling cabinet 122 is also used to route information received from I/O cards of the controller 104 to respective ones of the field devices 112*a-c* and 116*a-c* via the field junction boxes 120*a-b*.

The field devices 112*a-c* and 116*a-c* may be Fieldbus compliant valves, actuators, sensors, etc., in which case the field devices 112*a-c* and 116*a-c* communicate via a digital data bus using the well-known Fieldbus communication protocol. Of course, other types of field devices and communication protocols could be used instead. For example, the field devices 112*a-c* and 116*a-c* could instead be Profibus, HART, or AS-i compliant devices that communicate via the data bus using the well-known Profibus, AS-i and HART communication protocols. In some example implementations, the field devices 112*a-c* and 116*a-c* can communicate information using analog communications or discrete communications instead of digital communications. Additionally, the communication protocols can be used to communicate information associated with different data types.

To route information associated with the field devices 112*a-c* and 116*a-c* in the marshalling cabinet 122, the marshalling cabinet 122 is provided with a plurality of termination modules 124*a-c* and 126*a-c*. The termination modules 124*a-c* are configured to marshal information associated with the field devices 112*a-c* in the first process area 114 and the termination modules 126*a-c* are configured to marshal information associated with the field devices 116*a-c* in the second process area 118. In an alternative example implementation in which the marshalling cabinet 122 is omitted, the termination modules 124*a-c* and 126*a-c* can be installed in respective ones of the field junction boxes 120*a-b*. In yet other example implementations, the FJBs 120*a-b* may be communicatively coupled directly to the respective I/O cards 132*a-b* and 134*a-b*. Additionally, FIG. 1 depicts a point-to-point configuration in which each conductor or conductor pair (e.g., bus, twisted pair communication medium, two-wire communication medium, etc.) in multi-conductor cables 128*a-b* communicates information uniquely associated with a respective one of the field devices 112*a-c* and 116*a-c*.

To control I/O communications between the controller 104 (and/or the workstation 102) and the field devices 112*a-c* and 116*a-c*, the controller 104 is provided with the plurality of I/O cards 132*a-b* and 134*a-b*. In the illustrated example, the I/O cards 132*a-b* are configured to control I/O communications between the controller 104 (and/or the workstation 102) and the field devices 112*a-c* in the first process area 114, and the I/O cards 134*a-b* are configured to control I/O communications between the controller 104 (and/or the workstation 102) and the field devices 116*a-c* in the second process area 118.

To enable communications between the termination modules 124*a-c* and the I/O cards 132*a-b* and between the termination modules 126*a-c* and the I/O cards 134*a-b*, the termination modules 124*a-c* are communicatively coupled to the I/O cards 132*a-b* via a first universal I/O bus 136*a* and the termination modules 126*a-c* are communicatively coupled to the I/O cards 134*a-b* via a second universal I/O bus 136*b*. Each of the universal I/O buses 136*a-b* is configured to communicate information corresponding to a plurality of field devices (e.g., the field devices 112*a-c* and 116*a-c*) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexing communication techniques, etc.

The example process control system 100 of FIG. 1 includes the controller 104, the I/O scheduler 180 and/or the I/O data acquisition module 190 to manage the timing of input signals that originate from the field devices 112*a-c* and 116*a-c*. The example I/O data acquisition module 190 receives input signals that have propagated through the process control system 100 originating from the field devices 112*a-c* and 116*a-c*. The input signals may include analog input data signals, discrete input data signals, and/or digital input data signals. In some cases the termination modules 124*a-c* and 126*a-c* and/or the I/O cards 132*a-b* and 134*a-b* may convert the input signal from the field devices 112*a-c* and 116*a-c* into a digital input signal type. The field devices 112*a-c* and 116*a-c* generate input signals at periodic intervals depending on configuration, device type, and/or the type of the process that the field device is monitoring. These input signals propagate through the FJBs 120*a-b*, the termination modules 124*a-c* and 126*a-c* and the I/O cards 132*a-b* and 134*a-b* until they reach the I/O data acquisition module 190.

In some cases, the controller 104 may communicate a master time to the field devices 112*a-c* and 116*a-c*. The controller 104 may receive the master time from a master time device (not shown). Upon receiving the master time, the controller 104 may forward the master time to the I/O cards 132*a-b* and 134*a-b* via the I/O data acquisition module 190. The I/O cards 132*a-b* and 134*a-b* may then forward the master time to the respective field devices 112*a-c* and 116*a-c*. The field devices 112*a-c* and 116*a-c* may use the master time to timestamp input values and/or signals with a time at which the input is sensed or detected. In examples where a field device may not timestamp an input value, an I/O card that receives the input value from the field device may timestamp the input signal. To minimize and/or eliminate propagation latency in the transmission of the master time, the controller 104 may transmit the master time during periods of low activity within the process control system 100. Alternatively, the controller 104 may transmit time adjustment messages to compensate for known propagation delays.

Upon receiving input signals from the field devices 112*a-c* and 116*a-c*, the I/O data acquisition module 190 determines which input signals are to be forwarded to the controller 104 at certain times. Alternatively, the I/O data acquisition module 190 may forward input signals to the controller 104 upon receiving a request from the controller 104. The times for the I/O data acquisition module 190 to forward the input signals are communicated by the controller 104 and/or the I/O scheduler 180 via one or more timing messages (and/or timing adjustment messages). The I/O data acquisition module 190 stores the timing information included within the timing messages and forwards the input signals based on this timing information. Further, the timing adjustment message may cause the I/O data acquisition module 190 to modify the timing to request an input signal from the field device 112*a*. For example, the timing information may indicate that a first input signal from the field device 112*a* is to be forwarded during a first scheduled time period, a second input signal from the field device 112b is to be forwarded during a second scheduled time period, and a third input signal from the field device 112c is to be forwarded during a third scheduled time period. In examples where the field device 112a may send multiple first input signals at different times, the I/O data acquisition module 190 forwards to the I/O scheduler 180 the most recently received (i.e., the most current) first input signal.

In some examples, the I/O data acquisition module 190 may receive varying amounts of input signals, output signals, messages and other types of traffic. By managing which input signals are forwarded to the controller 104 within respectively scheduled time periods, the I/O data acquisition module 190 reduces network congestion within the process control system 100. Furthermore, if the I/O scheduler 180 determines that an input signal is not being received by the controller 104 within a scheduled time period, the I/O scheduler 180 and/or the controller 104 sends a timing adjustment message to the I/O data acquisition module 190. This message indicates the new periodic times at which the I/O data acquisition module 190 is to forward the input signal to the controller 104. Further, the timing adjustment message may cause the I/O data acquisition module 190 to modify the timing to request an input signal from a corresponding field device 112a.

In addition to receiving input signals, the example I/O data acquisition module 190 of FIG. 1 receives output signals originating from the controller 104. The output signals include control information for the field devices 112a-c and 116a-c to correct a process within the process control system 100. The I/O data acquisition module 190 may forward the output signals to the respective field devices 112a-c and 116a-c upon receiving the output signals and/or may forward the output signals based on priority. For example The I/O data acquisition module 190 may forward high priority output signals to the respective field devices 112a-c and 116a-c upon receiving the output signals and forward lower priority output signals (e.g., output signals not associated with the control loop) only during lower periods of network activity within the process control system 100.

The example controller 104 receives input signals from the I/O data acquisition module 190 and processes those input signals through one or more control loops operating within the controller 104. A control loop within the controller 104 utilizes certain input signals at specific times within the control loop as needed to calculate one or more control actions. The I/O scheduler 180 and/or the controller 104 manages the timing of the input signals so that the control loop receives the input signals within one or more respective scheduled time periods, with each scheduled time period corresponding to a time period during which the control loop is to process each of the input signals. If the controller 104 receives an input signal outside of its respective scheduled time period, the I/O scheduler 180 and/or the controller 104 calculates the time difference between receiving the input signal and a time within the scheduled time period.

For example, the I/O scheduler 180 may calculate the difference between the time at which the controller 104 received the first input signal and a beginning, a middle, and/or an end of the scheduled time period. Alternatively, the I/O scheduler 180 may calculate the difference between the time at which the controller 104 received the first input signal and any other time within the scheduled time period. The I/O scheduler 180 and/or the controller 104 then sends a timing adjustment message to the I/O data acquisition module 190 to adjust the times at which subsequent input signals associated with the input signal are to be forwarded to the controller 104. Further, the timing adjustment message may cause the I/O data acquisition module 190 to modify the timing to request an input signal from a field device.

Using the input signals, the example controller 104 of FIG. 1 calculates one or more control actions and generates an output signal. The controller 104 forwards the output signals to the I/O data acquisition module 190. The output signals are then transmitted to the corresponding field devices 112a-c and 116a-c that are to perform the calculated control action.

In cases when a field device is added to the process control system 100, the controller 104 updates the control loop to incorporate the new field device. This may include a process control engineer updating the control loop and/or adding another control loop to the controller 104. As a result of the new field device, the I/O scheduler 180 and/or the controller 104 updates the timing of the scheduled time periods to receive input signals to correspond to the changes in the control loop. The I/O scheduler 180 and/or the controller 104 then sends one or more timing adjustment messages to the I/O data acquisition module 190 with the new timing requirements. Because of this automatic update to the input signal timing, the control loop continues to run efficiently despite the addition of another field device. Furthermore, the update to the input signal timing occurs without any intervention by a process control engineer and/or an external optimization routine operated by the workstation 102. In the same manner, the I/O scheduler 180 and/or the controller 104 may adjust input signal timing in cases when field devices are removed from the process control system 100.

Additionally, the example controller 104 of FIG. 1 includes functionality to enable a process control engineer and/or operator, via the workstation 102, to tune the I/O scheduler 180 to filter input signal timing corrections as needed for topologies where significant timing overshoot or timing undershoot occurs. The timing overshoot and/or undershoot of the input signals may be due to noise within the process control system 100 and/or from an overloaded process control network.

Furthermore, the controller 104 and/or the I/O scheduler 180 may determine the quality of communication paths between the field devices 112a-c and 116a-c and the controller 104. The quality of a communication path may be determined based on the time needed for an input signal to propagate from a field device to the controller 104, the accuracy of the data within the input signal, the noise within the input signal, and/or any other criteria determined by a process control engineer.

Figure 2:
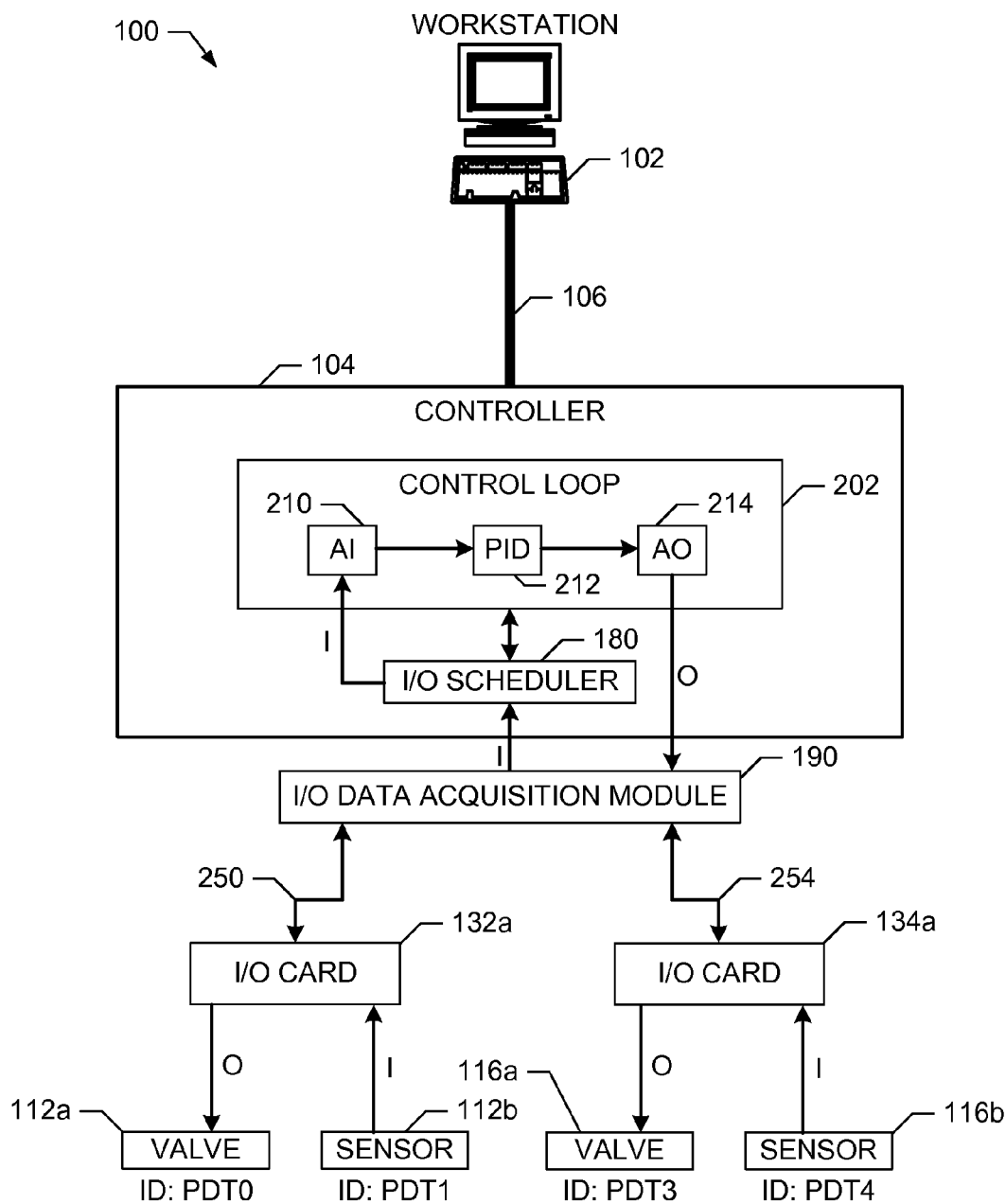
FIG. 2 is a diagram of an example control loop of the process control system of FIG. 1.

FIG. 2 shows the example process control system 100 of FIG. 1 including the controller 104 operating a control loop 202. The process components within FIG. 2 include two sets of feedback loops. The first feedback loop includes the field devices 112a and 112b. The second feedback loop includes the field devices 116a and 116b.

In the example of FIG. 2, the field device 112a is a valve that controls a fluid flow through a pipe in a process control system and the field device 112b is a sensor that measures a pressure of the fluid within the pipe. The valve 112a may include any type of process control valve and the sensor 112b may include any type of pressure sensor including, for example, a piezo-resistive wheatstone-bridge microelectromechanical stress sensing pressure sensor. The sensor 112b sends an input signal including the pressure value of the fluid within the pipe to the I/O card 132a. In some examples, the sensor 112b may send the input signal upon a request from the I/O data acquisition module 190. The input signal is received by the controller 104 and processed via the control loop 202. The control loop 202 then uses the input signal to calculate a control action for the valve 112a. The controller 104 transmits this control action via an output signal to the valve 112a. The valve 112a receives the output signal and changes its position based on the value of the output signal.

The process control system 100 includes the workstation 102 communicatively coupled to the controller 104 via the LAN 106. The controller 104 is communicatively coupled to the I/O data acquisition module 190. The I/O data acquisition module 190 is communicatively coupled to the I/O cards 132a and 134a via respective communication paths 250 and 254. The I/O cards 132b and 134b and their respective communication paths to the I/O data acquisition module 190 are not shown in FIG. 2. Furthermore, in other examples, the I/O data acquisition module 190 may be communicatively coupled to other I/O cards via other communication paths. The I/O card 132a is communicatively coupled to the field devices 112a and 112b (e.g., process control devices). Similarly, the I/O card 134a is communicatively coupled to the field devices 116a (e.g., a valve) and 116b (e.g., a sensor).

The example controller 104 of FIG. 2 includes the control loop 202 and the I/O scheduler 180. In other examples, the controller 104 may include the I/O data acquisition module 190. Furthermore, the I/O data acquisition module 190 may be implemented within the controller 104 as hardware and/or process executable instructions stored on a machine-accessible medium. In yet other examples, I/O data acquisition module 190 may be implemented within the I/O cards 132a and 132b.

The I/O scheduler 180 and/or the controller 104 manages the timing of the input signals originating from the sensors 112b and 116b. The I/O scheduler 180 forwards the input signals to the control loop 202 during each scheduled time period of the control loop 202. For example, the control loop 202 includes a scheduled time period during which the controller 104 is to receive an input signal originating from the sensor 112b and a scheduled time period during which the controller 104 is to receive an input signal originating from the sensor 116b. These scheduled time periods are predefined such that the control loop 202 receives each of the input signals from the respective sensors 112b and 116b prior to the control loop 202 utilizing and/or processing each of the input signals.

The example control loop 202 includes an input signal processor or function block (AI) 210, a proportional-integral-derivative control action calculator or function block (PID) 212, and an output signal generator or function block (AO) 214). A control algorithm and/or a routine within the control loop 202 receives input signals from the AI 210, processes the input signals using the PID 212, and generates output signals via the AO 214. A single control loop cycle may include a plurality of routines and/or control algorithms. In other examples the control loop 202 may include other types of AIs, PIDs, and/or AOs. Furthermore, other examples may include a plurality of each of the AIs 210, PIDs 212, and/or AOs 214.

The AI 210 receives input signals from the I/O scheduler 180 and configures the input signals for processing within the PID 212. The I/O scheduler 180 forwards input signals to the AI 210 during the scheduled time period for each input signal. In examples when the input signal is received by the I/O scheduler 180 before the start of a scheduled time period during which that input signal is needed for processing by the control loop 202, the I/O scheduler 180 delays forwarding the input signal until the scheduled time period. In other cases when the I/O scheduler 180 has not received an input signal by the end of the scheduled time period, the AI 210 may utilize an input signal previously sent from the same field device. Furthermore, when the I/O scheduler 180 does not receive input signals during the respective scheduled time periods, the I/O scheduler 180 and/or the controller 104 calculates the time difference between the time at which the input signal was received and its respective scheduled time period (e.g., the beginning or middle of its scheduled time period). The I/O scheduler 180 and/or the controller 104 then sends a timing adjustment message to the I/O data acquisition module 190 to adjust the timing of subsequent input signals from the same field device so that the I/O scheduler 180 receives the input signals during the appropriately scheduled time period(s) (i.e., time periods preceding the times at which signals are needed for processing by the controller 104 when executing, for example, the control loop 202). In other examples, the I/O scheduler 180 and/or the controller 104 may send one or more timing adjustment messages to the I/O data acquisition module 190 to incrementally adjust the timing of subsequent input signals from the same field device to avoid overshoot in the timing of the received input signals.

In an example implementation of FIG. 2, the sensor 112b transmits a high pressure input signal every 5 ms. In some examples, the I/O data acquisition module 190 may poll the sensor 112b for an input value on a 5 ms repeating cycle. The sensor 112b generates a first high pressure input signal and transmits the first high pressure signal to the I/O data acquisition module 190. Five milliseconds later, the sensor 112b generates a second high pressure input signal, and 5 ms after that the sensor 112b generates a third high pressure input signal, etc. The I/O data acquisition module 190 receives the first high pressure signal and determines when to forward the signal to the I/O scheduler 180. In this example, the control loop 202 operates at fixed cycles of 100 ms. At 20 ms into a control loop cycle, the control loop 202 utilizes the high pressure signal to calculate a control action. Thus, a control schedule may indicate, for example, that the high pressure input signal should arrive during a scheduled time period that begins 16 ms into the control loop cycle and ends 20 ms into the control loop cycle. Accordingly, the I/O data acquisition module 190 forwards the most recent high pressure signal to the control loop 202 during the 4 ms scheduled time period from 16 ms to 20 ms into the control loop cycle.

Upon receiving the most recent high pressure signal, the control loop 202 calculates a control action for the valve 112a. For example, the high pressure input signal may indicate a pressure value of 1805 bar. The PID 212 may then compare this value to a defined threshold value of 1700 bar. The 105 bar difference above the threshold may then cause the PID 212 to calculate a control action to open the valve 112a to lower the pressure in the pipe to below 1700 bar. This calculated control action is provided within an output signal generated by the AO 214 and transmitted to the valve 112a. Upon receiving the output signal, the valve 112a opens to reduce the pressure within the pipe.

If the I/O scheduler 180 receives the most recent high pressure signal before the 4 ms scheduled time period (e.g., at 10 ms into the control loop cycle), the I/O scheduler 180 forwards the signal to the control loop 202. Further, the I/O scheduler 180 and/or the controller 104 calculates the time difference from receiving the high pressure input signal and the scheduled time period (e.g., any time between 6-10 ms) and may send a timing adjustment message to the I/O data acquisition module 190 to modify the acquisition of one or more subsequent high pressure signals by 6-10 ms. The timing adjustment message may also indicate the delay time for the I/O data acquisition module 190 to request high pressure signals from the sensor 112b.

If the I/O scheduler 180 receives the first high pressure signal from the I/O data acquisition module 190 8 ms after the scheduled time period (e.g., 28 ms into the control loop cycle), the control loop 202 instead processes the most recently received high pressure input signal prior to 20 ms into the control loop cycle. Additionally, the I/O scheduler 180 and/or the controller 104 calculates the time difference between the time at which the high pressure input signal is received and the scheduled time period (e.g., any time between 8-12 ms) and sends a timing adjustment message to the I/O data acquisition module 190 to cause one or more subsequent high pressure signals to be sent or forwarded 8-12 ms sooner.

Additionally or alternatively, the I/O scheduler 180 and/or the controller 104 may calculate an average time difference using the recently determined time difference and previously determined time differences for previous high pressure signals to determine that multiple high pressure signals have been received after the respectively scheduled time periods. The I/O scheduler 180 and/or the controller 104 may then send the I/O data acquisition module 190 one or more timing adjustment messages to incrementally correct the timing of subsequent high pressure input signals. Upon correcting the input signal timing, the I/O data acquisition module 190 may then forward the second high pressure input signal to the I/O scheduler 180 during the appropriate scheduled time period.

Furthermore, in the example of FIG. 2, the sensor 116b transmits a low pressure input signal every 15 ms upon a request from the I/O data acquisition module 190. The control loop 202 may calculate a control action utilizing the low pressure input signal 40 ms into the control loop cycle. In a similar manner, the I/O scheduler 180 manages the timing of the low pressure input signal to ensure the controller 104 receives the signal within a defined scheduled time period during which the input signal is needed for processing by the controller 104 executing the control loop 202. Alternatively, the controller 104 may request the low pressure signal from the I/O scheduler 180 during the scheduled time period.

Figure 3:
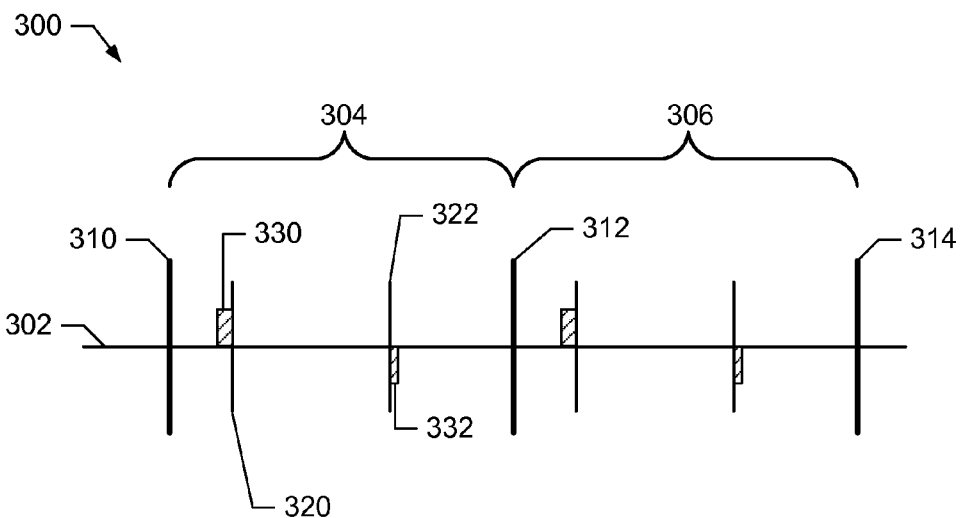
FIG. 3 is a timing diagram of the example control loop of FIG. 2.

FIG. 3 is a timing diagram 300 of the example control loop 202 of FIG. 2. The example timing diagram 300 shows timing requirements for a first input signal from a first field device (e.g., the field device 112b of FIGS. 1 and 2) and a second input signal from a second field device (e.g., the field device 116b of FIGS. 1 and 2) within the control loop 202. The timing requirements may be specified by a control schedule and/or configured by a process control engineer. The timing diagram 300 includes a timing axis 302. The example timing axis 302 may show the timing for a control loop in nanoseconds, microseconds, milliseconds, seconds, and/or minutes. The example timing diagram 300 shows a first control loop cycle 304 and a second control loop cycle 306. The first control loop cycle 304 may be preceded by one or more additional control loop cycles.

The first control loop cycle 304 starts at a first cycle time 310 and ends at a second cycle time 312. The second control loop cycle 306 starts at the second cycle time 312 and ends at a third cycle time 314. The time difference between the second cycle time 312 and the first cycle time 310 is identical to the time difference between the third cycle time 314 and the second cycle time 312. In other words, the time durations of the first control loop cycle 304 and the second control loop cycle 306 are the same. The routines, control algorithms, and/or control actions processed within the first control loop 304 are similarly processed within the second control loop 306. Furthermore, the timing of the routines, control algorithms, and/or control actions processed within the first control loop 304 are similar to the timing within the second control loop 306.

The example timing diagram 300 of FIG. 3 includes a first time 320 corresponding to the time at which the control loop 202 of FIG. 2 utilizes the first input signal. The timing diagram 300 also includes a first scheduled time period 330. The first scheduled time period 330 is a specified, predetermined, or scheduled period for the control loop 202 to receive the first input signal. The I/O scheduler 180 adjusts the timing of the first input signal as needed so that the first input signal is received by the control loop 202 during the scheduled time period 330. In some examples, the I/O scheduler 180 may forward the first input signal to the control loop 202 upon a request from the controller 104. The first input signal may be received by the control loop 202 at any time (e.g., a third time) within the first scheduled time period 330. In this example, the first scheduled time period 330 ends at the first time 320 and has a duration specified by either a process control engineer and/or configured by timing criteria within the controller 104 of FIGS. 1 and 2. The start of the first scheduled time period 330 corresponds to a fourth time. In other examples, the first scheduled time period 330 may end at some time before the first time 320.

The example timing diagram 300 includes a second time 322 at which the control loop 202 of FIG. 2 generates a first output signal calculated via a control action using the first input signal. A second scheduled time period 332 indicates a scheduled time period during which the control loop 202 transmits a first output signal. The duration and the start of the second scheduled time period 332 may be specified by a process control engineer and/or configured by timing criteria within the controller 104. Alternatively, the second time 322 may occur at substantially the same time as the first time 320. In this alternative example, the second scheduled time period 332 may occur after the first time 330.

In other examples, the timing diagram 300 may include other input signals with corresponding scheduled time periods. Further, if the control loop utilizes different input signals at relatively the same time, the controller 104 may request the I/O scheduler 180 to forward the input signals at the same time. Alternatively, if the control loop utilizes different input signals at relatively different times, the controller 104 may request the I/O scheduler 180 to forward the input signals at specified times.

Because the timing of the first control loop cycle 304 and the second control loop cycle 306 are similar, the relationship or the timing of the times 320 and 322 and/or the scheduled time periods 330 and 322 in the first control loop cycle 304 are similar to the second control loop cycle 306. The timing of the times 320 and 322 and/or the scheduled time periods 330 and 332 is also similar for additional control loop cycles (not shown).

Figure 4A:
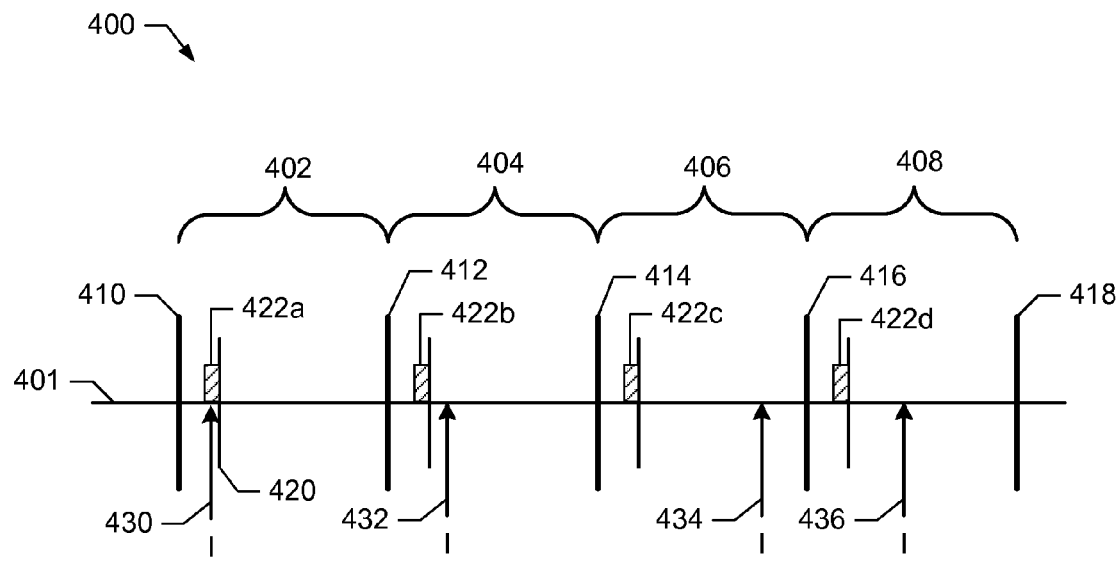
FIGS. 4A and 4B are timing diagrams that include received inputs of the example control loop of FIG. 2.

FIG. 4A is a timing diagram 400 of the example control loop 202 of FIG. 2. The example timing diagram 400 shows input signals 430-436 that may used to calculate an average deviation time from a corresponding scheduled time period 422a-d. The input signals 430-436 originate from the same field device (e.g., the sensor 112b). The timing diagram 400 includes a timing axis 401, a first control loop cycle 402, a second control loop cycle 404, a third control loop cycle 406, and a fourth control loop cycle 408. The timing diagram 400 also includes a first cycle time 410, a second cycle time 412, a third cycle time 414, a fourth cycle time 416, and a fifth cycle time 418. For clarity, the associated output signals are not shown. Further, the example timing diagram 400 may include additional control loop cycles and corresponding cycle times (not shown).

The example timing diagram 400 includes a first time 420 corresponding to the time at which the control loop 202 of FIG. 2 utilizes the first input signal 430. The timing diagram 400 includes the scheduled time period 422a, which is a specified, predetermined, and/or scheduled time period for the control loop 202 to receive the first input signal 430. The first time 420 and the scheduled time period 422a are repeated at substantially the same times within each of the control loop cycles 404-408. In addition to the timing diagram 400 showing the first input signal 430 during the first control loop cycle 402, the second input signal 432 is received during the second control loop cycle 404, the third input signal 434 is received during the third control loop cycle 406, and the fourth input signal 436 is received during the fourth control loop cycle 408.

During the first control loop cycle 402, the first input signal 430 is received during the scheduled time period 422a. However, the second, third, and fourth input signals 432, 434, and 436 are not received during the scheduled time periods 422b-d during respective control loop cycles 404-408. Specifically, the second input signal 432 is received slightly after the scheduled time period 422b, the third input signal is received towards the end of the third control loop cycle 406, and the fourth input signal 436 is received approximately midway through the fourth control loop cycle 408.

The example controller 104 and/or I/O scheduler 180 of FIGS. 1 and 2 may average the time differences between when the input signals 430-436 were received and the respective scheduled time periods 422a-d. If the average time indicates that the input signals 430-436 are not received during the respective scheduled time periods 422a-d, the controller 104 and/or the I/O scheduler 180 may adjust the timing so that subsequent input signals are received within the scheduled time periods 422a-d. However, if the average time indicates that the input signals 430-436 are received during respective scheduled time periods 422a-d, the controller 104 and/or the I/O scheduler 180 may not adjust the timing of subsequent input signals. By taking an average of when the input signals 430-436 are received, the controller 104 and/or the I/O scheduler 180 ensures the time for receiving input signals is not over-adjusted based on receiving only one or two input signals outside of the scheduled time period. In some examples, the controller 104 and/or the I/O scheduler 180 may average all of the received input signals from a field device or, alternatively, may compute a running average of the most recently received input signals (e.g., the ten most recent input signals).

However, in some examples, a process control engineer may desire to have subsequent input signals adjusted upon detecting a single input signal deviating from a scheduled time period. For example, the controller 104 and/or the I/O scheduler 180 may adjust the input timing for the input signals 434 and 436 upon detecting that the second input signal 432 was not received during the scheduled time period 422b within the second control loop cycle 404.

Figure 4B:
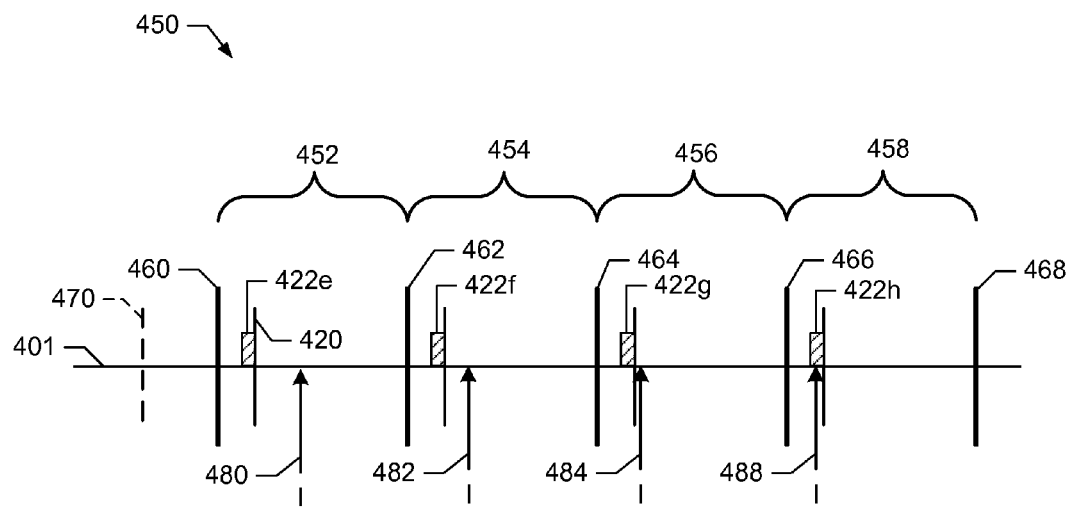

FIG. 4B is a timing diagram 450 of the control loop 202 of FIG. 2 including example input signals 480-488. The example timing diagram 450 shows how the controller 104 and/or the I/O scheduler 180 of FIGS. 1 and 2 may adjust input signal timing so that subsequent input signals are received by the controller 104 within the specified scheduled time periods 422e-h. The timing diagram 450 shows input signals 480-488 originating from a single field device (e.g., the high pressure input signals from the field device 112b of FIGS. 1 and 2). Furthermore, the timing diagram 450 shows the timing of the input signals 480-488 as they are received by the control loop 202 within the controller 104. In other examples, the timing diagram 450 may include other types of input signals from the same field device (e.g., temperature input signals, humidity input signals, etc.), and/or input signals from a plurality of other field devices.

The example timing diagram 450 of FIG. 4B includes the timing axis 401, the first time 420 and the scheduled time periods 422e-h that are similar to the scheduled time periods 422a-d of FIG. 4A. Additionally, the timing diagram 450 of FIG. 4B includes control loop cycles 452-458 that may occur sometime after the control loop cycles 402-408 of FIG. 4A. Additionally, the timing diagram 450 includes cycle times 460-468 that are associated with the respective control loop cycles 452-458. Output signals are not shown for clarity and because the timing of the output signals may not be affected by a time a corresponding input signal is received.

From the timing diagram 400 in FIG. 4A, the example controller 104 and/or the I/O scheduler 180 calculates that the input signals 430-436 are received at an average deviation time that is outside the scheduled time periods 422e-h. The example timing diagram 450 of FIG. 4B shows that at a time 470 a timing adjustment message is transmitted from the I/O scheduler 180 to the I/O data acquisition module 190. As a result of receiving the timing adjustment message, the I/O data acquisition module 190 adjusts its timing for requesting subsequent input signals from the field device or, alternatively, forwarding subsequent input signals to the controller 104.

The example timing diagram 450 shows that the I/O acquisition module 190 incrementally adjusts the timing of subsequent input signals 480-488. For example, the input signal 480 is received farther from the first time 420 during the control loop cycle 452 compared to the input signal 482 received during the control loop cycle 454 and the input signal 484 received during the control loop cycle 488. By the control loop cycle 458, the I/O data acquisition module 190 has adjusted the timing so that the input signal 488 is received by the controller 104 during the scheduled time period 422h. In other examples, the adjustment of input signals so that they are received within respective scheduled time period may require more or fewer control loop cycles. By incrementally adjusting the timing schedule, the I/O data acquisition module 190 ensures the input timing (e.g., the reception of the input signals 480-488 and/or subsequent input signals) does not overshoot the scheduled time period.

Further, the example timing diagram 450 shows a timing adjustment message being sent at the time 470. In other examples, a timing adjustment message may be sent to the I/O data acquisition module 190 every control loop cycle 452-458 until input signals are received within the scheduled time periods 422e-h. In other example implementations, upon the controller 104 and/or the I/O scheduler 180 determining that a timing adjustment message is to be sent to the I/O data acquisition module 190, the I/O data acquisition module 190 may adjust the timing of subsequent input signals such that the next input signal is received by the controller 104 during the scheduled time period. In this manner, the I/O data acquisition module 190 may adjust the timing of input signals to be received during the next scheduled time period without incrementally adjusting the timing. Thus, for example, the I/O data acquisition module 190 may adjust the timing of the input signal 480 so that it is received by the controller 104 during the scheduled time period 422e.

Figure 5:
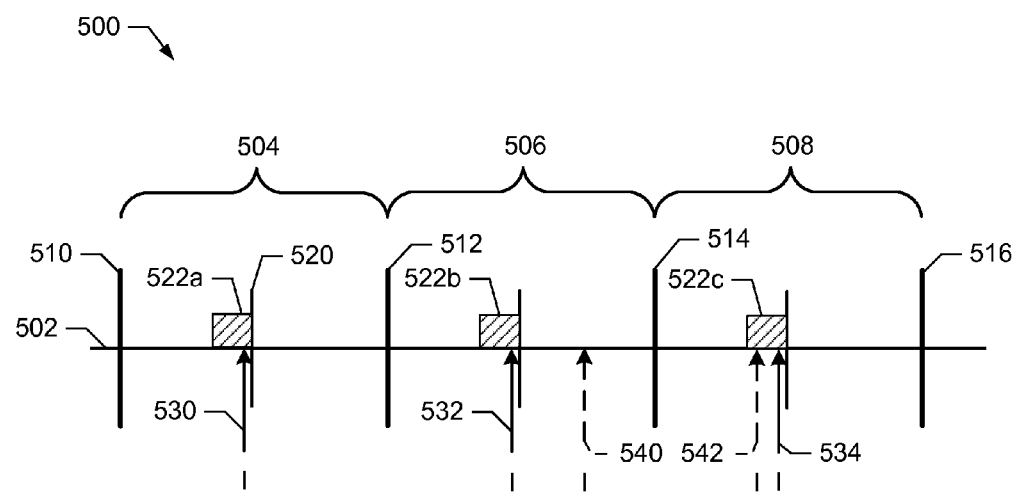
FIG. 5 is a timing diagram for a control loop showing input signal timing adjustments in response to the addition of a second field device to a process control system.

FIG. 5 is a timing diagram 500 for a control loop showing input signal timing adjustments in response to the addition of a second field device to a process control system. The timing diagram 500 includes a timing axis 502 that is similar to the timing axis 302 of FIG. 3. Additionally, the example timing diagram 500 includes a first control loop cycle 504, a second control loop cycle 506, and a third control loop cycle 508. The control loop cycles 504-508 have the same scheduled time period. The first control loop cycle 504 starts at a first time cycle 510 and ends at a second time cycle 512. The second control loop cycle 506 starts at the second time cycle 512 and ends at a third time cycle 514. The third control loop cycle 506 starts at the third time cycle 514 and ends at a fourth time cycle 516.

The first control loop cycle 504 shows a properly timed routine and/or control algorithm for a control loop. During the first control loop cycle 504, the control loop includes a first time 520 corresponding to when the control loop processes and/or calculates a control action for a first input signal 530 originating from a first field device. The first input signal 530 is received by the controller 104 during a first scheduled time period 522a. Subsequently, after the controller 104 calculates the control action utilizing the first input signal 530, the controller 104 may generate an output signal sometime during and/or after the first time 520. For clarity and because output signals may not be affected by the timing of input signals, output signals are not shown in FIG. 5. Additionally, the first time 520 and the scheduled time period 522a are repeated at substantially the same times within each control loop cycle 506 and 508.

The second control loop cycle 506 shows an addition of a second field device to the process control system. The controller 104 receives a second input signal 540 that originated from the newly added second field device. In this example, the second field device was added to the control loop sufficiently recently such that the I/O scheduler 180 of FIGS. 1 and 2 has not yet adjusted the timing for the second input signal 540 originating from the second field device.

The second input signal 540 is received outside the scheduled time period 522b during the second control loop cycle 506. The timing diagram 500 shows that a first input signal 532 associated with the first field device and received during the scheduled time period 522b of the second control loop cycle 506 was not affected with the addition of the second field device. However, in other examples, the first input signal 532 may be affected by the addition of the second field device and may be received by the controller 104 before or after the scheduled time period 522b.

Further, the example timing diagram 500 shows the scheduled time period 522b as a time when the first and second input signals 532 and 540 are to be received by the controller 104. The common scheduled time periods 522a-c for the first and second input signals is a result of the controller 104 that may include a routine that accesses and/or reads input signals from all corresponding field devices during one time period of (e.g., during execution of a particular part of) the routine. However, in other examples, the controller 104 may include other scheduled time periods to receive different input signals. In these other example implementations, a second scheduled time period may be included within the second control loop cycle that specifies when the second input signal 540 of FIG. 5 should be received.

During the second control loop cycle 506 of FIG. 5, the I/O scheduler 180 determines that the second input signal 540 was received after the scheduled time period 522b. The I/O scheduler 180 calculates the time difference between the scheduled time period 522b in the second control loop cycle 506 and the time at which the second input signal 540 was received. The I/O scheduler 180 and/or the controller 104 may calculate the difference between the time at which the controller 104 received the second input signal 540 and a beginning, a middle, and/or an end of the scheduled time period 522b. Alternatively, the I/O scheduler 180 and/or the controller 104 may calculate the difference between the time at which the controller 104 received the second input signal 540 and any time within the scheduled time period 522b. The I/O scheduler 180 and/or the controller 104 then transmit(s) a timing adjustment message to the I/O data acquisition module 190 of FIGS. 1 and 2 including the calculated time difference. Upon receiving the timing adjustment message, the I/O data acquisition module 190 adjusts its timing for forwarding and/or requesting input signals originating from the first field device.

The example timing diagram 500 indicates that the controller 104 and/or the I/O scheduler 180 sends a timing adjustment message upon detecting the second input signal 540 was not received during the scheduled time period 522b. However, in other examples, the controller 104 and/or the I/O scheduler 180 may compile time differences for subsequent input signals from the second field device to determine if an average time deviation is outside a respective scheduled time period 522. If the average deviation time is outside the scheduled time period 522, the controller 104 and/or the I/O scheduler 180 may transmit a timing adjustment message to the I/O data acquisition module 190.

In the example of FIG. 5, the I/O data acquisition module 190 adjusts the timing for input signals originating from the second field device prior to the start of the third control loop cycle 508. In other examples, the I/O data acquisition module 190 may incrementally adjust the timing of subsequent input signals from the second field device over subsequent control loop cycles. During the third control loop cycle 508, the controller 104 receives an input signal 534 originating from the first field device during the scheduled time period 522c. Furthermore, the controller 104 receives an input signal 542 originating from the second field device during the scheduled time period 522c. As a result of the I/O scheduler 180 adjusting the timing of input signals from the second field device upon the addition of the second field device, the control loop is properly timed again within one control cycle of the addition of the second field device. In other examples, the I/O scheduler 180 may not have the input signals properly adjusted until two or more control loop cycles following the addition of the second field device.

Figure 6:
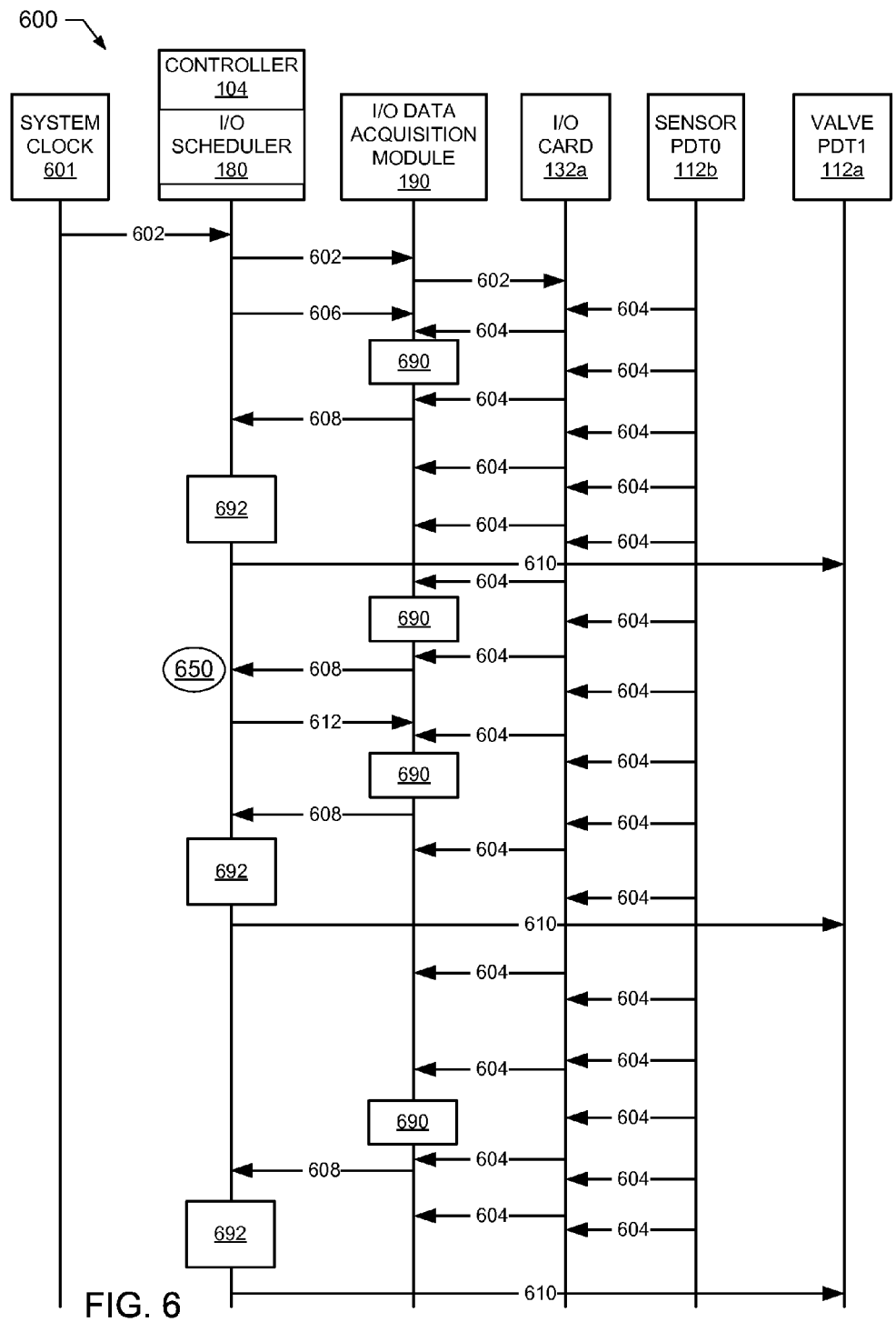
FIG. 6 is a message flow diagram for the control loop and process control system of FIGS. 1 and 2.

FIG. 6 is a message flow diagram 600 for the control loop 202 and the process control system 100 of FIGS. 1 and 2. The example message flow diagram 600 shows input signals 604 and 608, timing adjustment messages 606 and 612, and output signals 610 propagating through the process control system 100. The message flow diagram 600 includes the controller 104, the scheduler 180, the I/O data acquisition module 190, the I/O card 132a, and the field devices 112a-b of FIGS. 1 and 2. Additionally, the message flow diagram 600 includes a system clock 601. The example system clock 601 may be included within the workstation 102 and/or the controller 104.

The example message flow diagram 600 of FIG. 6 descends subsequently in time. While the message flow diagram 600 includes some signals and messages, the message flow diagram 600 does not show all possible signals and/or messages within the process control system 100. In other examples, the controller 104, the I/O scheduler 180, the I/O data acquisition module 190, and/or the I/O card 132a may transmit acknowledgment messages, awake messages, aware messages, sleep messages, status messages, and/or any other types of messages commonly transmitted within a process control system and/or a network.

The example message flow diagram 600 begins with the system clock 601 transmitting a current time message 602. This current time message 602 may include the master time and/or an update to the master time. This current time message 602 is received by the controller 104, the I/O data acquisition module 190 and the I/O card 132a. In other examples, the field devices 112a-b may receive the current time message 602. As a result of receiving the current time message 602, the controller 104, the I/O data acquisition module 190 and the I/O card 132a operate on the same timing scheme, which enables each device to forward and/or receive input signals during a specified scheduled time period. Additionally, the current time message 602 enables the controller 104, the I/O data acquisition module 190 and the I/O card 132a to synchronize for time-stamping input signals and/or processing input signals with time-stamps.

Upon receiving the current time message 602, the I/O scheduler 180 transmits an initial timing message 606 to the I/O data acquisition module 190. The initial timing message 606 includes the times for the I/O data acquisition module 190 to forward time-stamped input signals 608 from the field device 112b to the controller 104. In other examples, the initial timing message may include the times for input signals originating from other field devices. The I/O scheduler 180 determines the timing for the time-stamped input signals 608 using a control schedule and/or by monitoring the routines and/or control algorithms within a control loop operating within the controller 104. Upon receiving the initial timing message 606, the I/O data acquisition module 190 begins forwarding time-stamped input signals 604 originating from the field device 112b during the specified scheduled time periods.

The field device 112b transmits periodic input signals 604 through the process control system 100 to the I/O card 132a upon a request from the controller 104 (not shown). The field device 112b sends the input signals 604 independent of the timing of the control loop. The timing of the input signals 604 may be specified by a process control engineer, may be designed into the field device 112b, and/or may be determined by configuration routines to set up the process control system 100. Upon receiving the input signals 604, the I/O card 132a forwards the input signals 604 to the I/O data acquisition module 190. The I/O card 132a forwards the input signals 604 to the I/O data acquisition module 190 at a different scheduled time period from the scheduled time period that the I/O card 132a receives the input signals 604 from the field device 112b. The difference in scheduled time periods may be a result of processing availability within the I/O card 132a for receiving input signals from other field devices and/or for transmitting output signals 610 to the field device 112a and/or other field devices.

Upon receiving the first input signal 604, the I/O data acquisition module 190 time-stamps 690 the input signal 604 and transmits the time-stamped input signal 608 to the controller 104. In the example of FIG. 6, the I/O data acquisition module 190 only time-stamps 690 input signals 604 that are forwarded to the controller 104 during the specified scheduled time period. If the I/O data acquisition module 190 received multiple input signals 604 prior to a scheduled time period, the I/O data acquisition module 190 selects the most recently received input signal 604. The I/O data acquisition module 190 disregards and/or deletes the other previously received input signals. In other examples, the I/O card 132a and/or the field device 112b may time-stamp the input signals 604 before they are sent to the I/O data acquisition module 190.

Upon receiving the time-stamped input signal 608, the I/O scheduler 180 determines if the time-stamped input signal 608 was received during a scheduled time period of the control loop (block 692) corresponding to a time before the control loop utilizes and/or processes the time-stamped input signal 608. The scheduled time period 692 may be a specified threshold and/or tolerance of the control loop to receive the time-stamped input signal 608. In the example of FIG. 6, the I/O scheduler 180 receives the time-stamped input signal 608 within the scheduled time period of the control loop (block 692). Additionally, the control loop processes (block 692) the time-stamped input signal 608 and generates the output signal 610. The output signal 610 is then transmitted from the controller 104 to the I/O data acquisition module 190, which forwards the output signal 610 to the I/O card 132a, which then forwards the output signal 610 to the field device 112a. The output signal 610 is shown as being forwarded by the I/O data acquisition module 190 and the I/O card 132a as soon as the output signal 610 is received. However, in some examples, there may be some time from when the output signal is received and when the output signal 610 is forwarded by the I/O data acquisition module 190 and/or the I/O card 132a.

In the second instance of the I/O scheduler 180 receiving the time-stamped input signal 608, the I/O scheduler determines (at oval 650) that the time-stamped input signal 608 was received prior to the scheduled time period of the control loop (e.g., block 692). As a result of the early arrival of the time-stamped input signal 608, the I/O scheduler 180 calculates the time difference between receiving the time-stamped input signal 608 and the scheduled time period (at block 692) and sends the timing adjustment message 612 to the I/O data acquisition module 190. Upon receiving the timing adjustment message 612, the I/O data acquisition module 190 adjusts its timing for transmitting subsequent time-stamped input signals 608. Further, upon receiving the timing adjustment message 612, the I/O data acquisition module 190 adjusts its timing for requesting subsequent input signals 604 from the field device 112b. In examples where the I/O data acquisition module 190 is included within the I/O card 132a, the timing adjustment message 612 is sent from the I/O scheduler 180 to the I/O card 132a.

Alternatively, the I/O scheduler 180 and/or the controller 104 may continue to receive time-stamped input signals 608 to determine if an average time of the received signals 608 is consistently outside the scheduled time period 692. If the I/O scheduler 180 and/or the controller 104 determines that the average of the time-stamped input signals 608 is outside the scheduled time period 692, the I/O scheduler 180 and/or controller 104 may forward incremental timing adjustment messages to the I/O data acquisition module 190 to adjust the timing of subsequent time-stamped input signals 608. The example message flow diagram 600 concludes with the I/O data acquisition module 190 transmitting the last two time-stamped input signals 608 during the respectively scheduled time periods prior to the control loop utilizing the time-stamped input signals 608 (e.g., the last two blocks 692).

Figure 7:
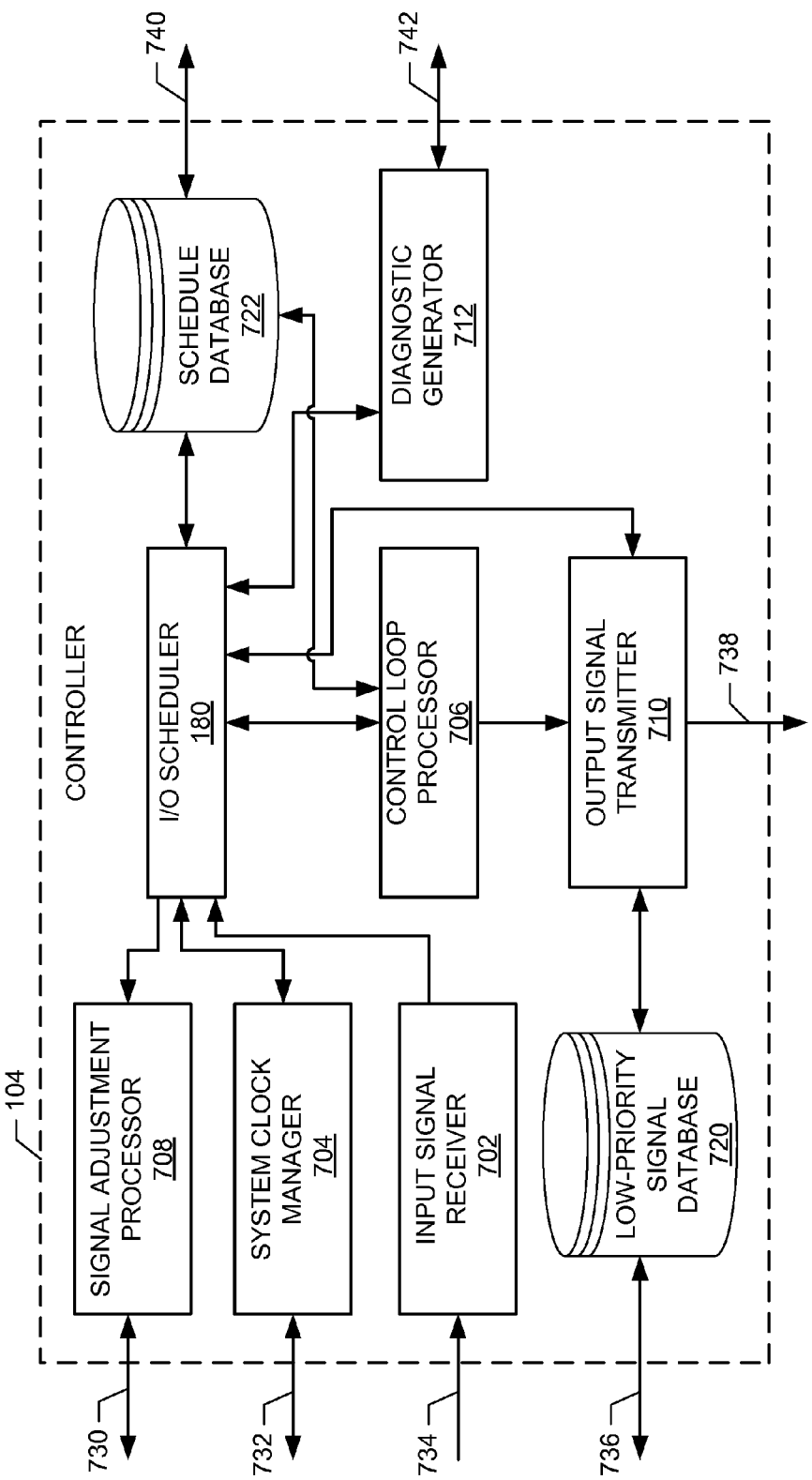
FIG. 7 is a block diagram of an example controller within the process control system of FIGS. 1 and 2.

FIG. 7 is a detailed block diagram of the example controller 104 of FIGS. 1 and 2. The example controller 104 of FIG. 7 does not include the I/O data acquisition module 190. However, in other example implementations, the controller 104 may include the I/O data acquisition module 190 as a separate functional block and/or as a functional block included within one or more of functional blocks 702 and 708. Additionally or alternatively, the example controller 104 may include functional blocks for communicating with other controllers within the process control system 100 of FIG. 1.

To receive inputs from the I/O data acquisition module 190 of FIG. 1 and/or I/O cards, the example controller 104 of FIG. 7 includes an input signal receiver 702 (e.g., a receiver). The input signal receiver 702 receives digital information for processing by the I/O scheduler 180. The digital signals may include information forwarded from the I/O data acquisition module 190 and/or the I/O cards 132*a-b* and 134*a-b*. In some examples, the input signal receiver 702 may request input signals from the I/O data acquisition module 190 based on requests from the I/O scheduler 180.

The example input signal receiver 702 may also time-stamp a received input signal and include the time-stamp with the digital information forwarded to the I/O scheduler 180. The time-stamp indicates the time at which the controller 104 received the input signal. Additionally, in some example implementations, the input signal receiver 702 may queue input signals for the I/O scheduler 180. The input signal receiver 702 may queue the input signals until a time at which the I/O scheduler 180 is available to process the input signals and/or at specific scheduled time periods defined by a process control engineer.

In the example of FIG. 7, the input signal receiver 702 is communicatively coupled to the I/O data acquisition module 190 via a communication path 734. The example communication path 734 may operate using any protocol including Ethernet, universal serial bus (USB), IEEE 1394, etc. Alternatively, the communication path 734 may be wirelessly communicatively coupled to the I/O data acquisition module 190 and can be implemented by using a wireless communication medium (e.g., wireless Ethernet, IEEE-802.11, Wi-Fi®, Bluetooth®, etc.).

To manage a master time for the I/O scheduler 180, the example controller 104 of FIG. 7 includes a system clock manager 704. The example system clock manager 704 receives updates of the master time for the process control system 100 of FIG. 1. The master time is a common time for all components within the process control system 100 that may be managed and/or set by the workstation 102. In other examples, the example system clock manager 704 may manage and/or set the master time for the process control system 100.

The master time may be a common time for components within the process control system 100 that may be associated with a control loop (e.g., the control loop 202 of FIG. 2). By having the components within the process control system 100 operating in accordance with the same master time, the I/O scheduler 180 can manage the timing of input signals without having to compensate for clock differences between each of the components. Furthermore, by having a common clock for the entire process control system 100 or, alternatively, for the controller 104 and communicatively coupled field devices, time-stamped data generated by field devices can be processed by the I/O scheduler 180 without timing errors or compensating for the clock differences. For example, if the field device 112*a* uses a different master clock than the controller 104, any time-stamped data by the field device 112*a* will have a different reference time when analyzed by the I/O scheduler 180. This difference in clocks may skew the calculated time for the input signal to propagate from the field device 112*a* to the controller 104, thus skewing a perceived quality of the communication path.

The example system clock manager 704 of FIG. 7 receives updates of the master clock time from the workstation 102 via the LAN 106. The system clock manager 704 may include a clock controlled by hardware, firmware, machine readable-accessible medium and/or any other type of components for operating a system clock. In some examples, the system clock manager 704 may manage the master clock time, send updates, and/or transmit the master time via a master clock message to components within the process control system 100 of FIG. 1. Additionally, the system clock manager 704 provides the I/O scheduler 180 with the master time.

The example system clock manager 704 may transmit the master time and/or updates to the master time via a communication path 732. The communication path 732 may be coupled to the I/O data acquisition module 190, the I/O cards 132*a-b* and 134*a-b*, the marshalling cabinet 122, the FJBs 120*a-b*, and/or the field devices 112*a-c* and 116*a-c* via the universal I/O buses 136*a-b*, and/or the multi-conductor cables 128*a-b* of FIG. 1. Furthermore, by providing the I/O acquisition module 190 with updates of the master time of the controller 104, the I/O acquisition module 190 may transmit input signals to the controller 104 within the scheduled time period of a control loop allotted to each input signal.

The system clock manager 704 may transmit the master clock time and/or updates to the master clock time at periodic intervals upon an instruction from the I/O scheduler 180. Updates to the master clock may be based on established standards including the National Timing Protocol and/or the Institute of Electrical and Electronics Engineers 1588-2002 Standard for Synchronizing Clocks. For example, the I/O scheduler 180 may determine that input signals from some field devices are consistently arriving late. As a result, the I/O scheduler 180 may send a message to the system clock manager 704 to refresh the master clock. Upon receiving the message, the system clock manager 704 transmits a master clock message and/or an update message to the components within the process control system 100.

To manage the timing of input signals, the example controller 104 of FIG. 7 includes the I/O scheduler 180 (e.g., a scheduler). The example I/O scheduler 180 determines if input signals originating from the field devices 112*a-c* and 116*a-c* (e.g., process control devices) are received during scheduled time periods for a control loop operating on a control loop processor 706. If any of the input signals are received outside of the scheduled time periods, the example I/O scheduler 180 determines the timing adjustment required to cause the input signal to be received within the scheduled time period. Additionally, upon determining an adjustment time for the input signal, the I/O scheduler 180 sends a timing adjustment message to the I/O data acquisition module 190 to adjust its timing to forward and/or request subsequent input signals associated with the affected input signal. The timing adjustment message may include any analog signal, discrete signal, or a digital signal to convey the timing adjustment information.

The scheduled time periods and/or the timing of the control loop may be specified within a control schedule stored within a schedule database 722. The I/O scheduler 180 may access the schedule database 722 periodically for updates to the control schedule. Additionally, the I/O scheduler 180 may transmit the control schedule to the control loop processor 706 so that the control loop processor 706 may configure a control loop routine according to the control schedule. In other example implementations, the control loop and/or the routine may be set in the control loop processor 706 by process control engineers. In this case, the I/O scheduler 180 may compile a control schedule from the control loop and store the control schedule in the schedule database 722. The example I/O scheduler 180 adjusts the control schedule for any subsequent changes made to the control loop by the workstation 102 or by a process control engineer. The control schedule includes the timing of control actions within the control loop (e.g., utilizes information within an input signal), the periods to receive input signals for each of the control actions, and the times at which outputs are generated for each control action.

To store the control schedule for the I/O scheduler 180, the example controller 104 includes the schedule database 722.

The example schedule database 722 of FIG. 7 may be implemented by EEPROM, RAM, ROM, and/or any other type of memory. In addition to storing the control schedule, the schedule database 722 may store threshold values for the I/O scheduler 108 to identify latency within the process control system 100.

A process control engineer may modify and/or add a new control schedule to the schedule database 722 via a communication path 740. The communication path 740 may include the LAN 106. The example communication path 740 may be implemented by Ethernet, universal serial bus (USB), IEEE 1394, etc. Alternatively, the communication path 740 may be wirelessly communicatively coupled to the workstation 102 and/or any other workstation and can be implemented by using a wireless communication medium (e.g., wireless Ethernet, IEEE-802.11, Wi-Fi®, Bluetooth®, etc.).

The example I/O scheduler 180 of FIG. 7 monitors the progress of each cycle of the control loop within the control loop processor 706 to determine if an input signal is received within a scheduled time period for a control action. For example, if the control loop processor 706 is operating a control loop that includes a calculation of a first control action, the I/O scheduler 180 tracks when the current time approaches the time at which the control loop processor 706 is to perform the calculation. The I/O scheduler 180 then accesses the control schedule to identify the scheduled time period prior to the first control action and determines if the input signal corresponding to the first control action has been received. If the input signal has been received before this scheduled time period, the I/O schedule 180 calculates the time difference between the time at which the input signal was received and the scheduled time period. The I/O scheduler 180 then generates a message including information relating to the time adjustment (e.g., a timing adjustment message) based on the calculated difference and transmits the message to the I/O data acquisition module 190. Additionally, the I/O scheduler 180 forwards the input signal to the control loop processor 706.

If the input signal was not received by the controller 104 during the scheduled time period, the I/O scheduler 180 waits until the input signal is received and calculates a time difference between the time which the input signal was received and the scheduled time period. The I/O scheduler 180 then generates a timing adjustment message including the calculated time difference and transmits the timing adjustment message to the I/O data acquisition module 190. The I/O scheduler 180 transmits the timing messages to a signal adjustment processor 708 for forwarding to the I/O data acquisition module 190.

Additionally or alternatively, in examples when the I/O scheduler 180 determines that an input signal is received outside of the scheduled time period, the I/O scheduler 180 may determine an average deviation time based on previous and/or subsequent input signals compared to respectively scheduled time periods. This average deviation time may be used to determine if the timing of input signals originating from a common field device is consistently outside of a scheduled time period. For example, input signals originating from a sensor that are progressively received by the I/O scheduler 180 at later times after the respectively scheduled time periods may be averaged to determine that the input signals from the sensor are deviating from the scheduled time period. If the average deviation time is outside the scheduled time period, the I/O scheduler 180 may transmit one or more timing adjustment messages to the I/O data acquisition module 190 to incrementally bring subsequent input signals within respective scheduled time periods.

In examples when the I/O scheduler 180 receives two input signals at two different times from the same field device with same type of process control information prior to a scheduled time period for a control action, the I/O scheduler 180 processes the later arriving input signal. Furthermore the example I/O scheduler 180 of FIG. 7 adjusts the control schedule in examples when field devices are added or removed from the process control system 100. For example, when a field device is added, the control loop is adjusted to process data from the newly added field device. The I/O scheduler 180 may adjust the control schedule for a new field device based on instructions from a process control engineer. In some cases, the engineer may add an input signal associated with the newly added field device without having to adjust and/or modify the control loop. However, in some other examples where the control loop cannot accommodate the new input signal without modification, the control loop schedule may be adjusted by the engineer and/or the I/O scheduler 180 so that the new input signal may be included within the control loop. Adjusting may include modifying the timing when input signals are forwarded and/or requested and/or may include increasing a duration of a scheduled time period to receive the input signals. As a result of the update to the control loop, the I/O scheduler 180 updates the control schedule with the new timing requirements for signal inputs, when control actions are calculated, and/or when output signals are generated. Additionally, the I/O scheduler 180 sends a timing adjustment message to the I/O data acquisition module 190 including the new timing requirements for forwarding and/or requesting input signals from the newly added field devices.

In other examples, a process control engineer may update a control schedule and/or the control loop with the addition of a new field device. Upon receiving the updated control schedule, the I/O scheduler 180 transmits an adjustment message to the I/O data acquisition module 190 with the updated input signal timing requirements.

To transmit timing adjustment messages originating from the I/O scheduler 180, the example controller 104 of FIG. 7 includes the signal adjustment processor 708. The example signal adjustment processor 708 manages the transmission of timing adjustment messages to the I/O data acquisition module 190 and/or the I/O cards 132*a-b* and 134*a-b*. If the I/O data acquisition module 190 is not responding, the signal adjustment processor 708 may continue to transmit the timing adjustment message and/or delay sending the timing adjustment message until the I/O data acquisition module 190 is capable of receiving messages again.

Upon receiving a timing message from the I/O scheduler 180, the signal adjustment processor 708 may convert the message into a format for transmission via a communication path 730 to the I/O data acquisition module 190. The example communication path 730 may be implemented by Ethernet, universal serial bus (USB), IEEE 1394, etc. Alternatively, the communication path 730 may be wirelessly communicatively coupled to the I/O data acquisition module 190 and/or the I/O cards 132*a-b* and 134*a-b* and can be implemented by using a wireless communication medium (e.g., wireless Ethernet, IEEE-802.11, Wi-Fi®, Bluetooth®, etc.).

The example I/O scheduler 180 manages the forwarding of input signals to the control loop processor 706. In examples when the I/O scheduler 180 receives an input signal before and/or during a scheduled time period for a control action, the I/O scheduler 180 forwards the input signal to the control loop processor 706 during the scheduled time period. Additionally or alternatively, the I/O scheduler 180 may supply the input signal to the control loop processor 706 upon a request from the control loop processor 706 at the scheduled time period. In other cases when the I/O scheduler 180 receives an input signal after the scheduled time period for the control action, the I/O scheduler 180 may hold the input signal until the scheduled time period occurs again during the next control loop cycle.

If the I/O scheduler 180 receives a next similar input signal from the same field device, the I/O scheduler 180 may delete and/or disregard the prior input signal and forward the next input signal to the control loop processor 706 during the scheduled time period. By restricting the forwarding of input signals to the control loop processor 706 for only the scheduled time periods of the control actions corresponding to the respective input signals, the I/O scheduler 180 maintains the efficiency of the control loop processor 706. This efficiency ensures the control loop processor 706 does not have to manage input signals during times at which other control actions are to be calculated. Additionally, if the I/O scheduler 180 determines an input signal is received outside of the scheduled time period, the I/O scheduler 180 may correct the timing of the input signal prior to the next control loop cycle.

The I/O scheduler 180 enables a process control operator to tune the correction of the timing of input signals by specifying a correction as needed for topologies where significant overshoot or undershoot are not being realized due to a noisy and/or overloaded process control system 100. A process control operator may access the I/O scheduler 180 via the connection 740 and the schedule database 722.

The example I/O scheduler 180 of FIG. 7 may also determine the quality of a communication path between any one of the field devices 112*a*-*c* and 116*a*-*c* and the controller 104. The I/O scheduler 180 may determine the quality of a communication path by calculating the time for an input signal to propagate from the originating field device to the controller 104. For example, the I/O scheduler 180 may analyze the time-stamped information within the input signal to determine propagation time. The time-stamped information may include the time at which the input signal was generated and/or transmitted by a field device, a time at which the input signal was forwarded by an I/O card, a time at which the input signal was forwarded by the I/O data acquisition module 190, and/or a time at which the input signal was received by the input signal receiver 702.

The I/O scheduler 180 calculates the propagation time between each process control component and compares the time to a predefined threshold. A threshold may be defined for each propagation path or step (e.g., from the FJB 120*a* to the termination module 124*a* via the multi-conductor cable 128*a*) or, alternatively, for the entire communication path (e.g., from the field device 112*a* to the controller 104). If the calculated propagation time exceeds a threshold, the I/O scheduler 180 may generate a diagnostic message indicating there is an issue with a portion and/or all of a communication path. The diagnostic message may indicate there is a time delay and/or latency in the propagation of input signals in a portion of the process control system 100. The I/O scheduler 180 transmits diagnostic messages to a diagnostic generator 712.

If the time-stamped information includes time-stamps from each of the process control components (e.g., the I/O card 132*a*, the I/O data acquisition module 190, etc), the I/O scheduler 180 may indicate in the diagnostic message the portion of the communication path with the issue. Furthermore, the I/O scheduler 180 may adjust the timing of the input signal affected by the time delay by sending a timing message to the I/O data acquisition module 190. This timing message ensures that the input signals propagated along the same communication path are received in a timely manner by the controller 104 within the corresponding scheduled time period in the control loop. In some cases where the latency of the input signal propagation exceeds the period of the control loop, a process control engineer may slow the control loop by adjusting the control schedule to allow for the input signals to arrive at the controller 104 at least once per control loop cycle.

To transmit diagnostic messages to the workstation 102 of FIG. 1, the example controller 104 of FIG. 7 includes the diagnostic generator 712. The example diagnostic generator 712 manages the transmission of diagnostic messages. Upon receiving a diagnostic message from the I/O scheduler 180, the diagnostic generator 712 converts the message into a format for transmission via a communication path 742 to the workstation 102. The communication path 742 may include the LAN 106. The example communication path 742 may be implemented by Ethernet, universal serial bus (USB), IEEE 1394, etc. Alternatively, the communication path 742 may be wirelessly communicatively coupled to the workstation 102 and/or any other workstation and can be implemented by using a wireless communication medium (e.g., wireless Ethernet, IEEE-802.11, Wi-Fi®, Bluetooth®, etc.).

Additionally, if the receiving workstation 102 is not responding, the diagnostic generator 712 may continue to transmit the diagnostic message and/or delay sending the diagnostic message until the workstation 102 is capable of receiving messages again. Furthermore, process control engineers and/or operators may modify thresholds for identifying latency in the propagation of input signals by sending messages to the diagnostic generator 712. Upon receiving these messages, the diagnostic generator 712 forwards the message to the I/O scheduler 180. The diagnostic messages may indicate which part of the process control system 100 (e.g., a communication path) is inducing latency with the propagation of input signals and/or may indicate that a once troublesome communication path does not have latency issues and the diagnostic warning associated with the communication path can be deactivated.

To operate a process control algorithm including a routine and/or a control loop (e.g., the control loop 202 of FIG. 2), the example controller 104 of FIG. 7 includes the control loop processor 706. The example control loop processor operates a control loop with a predefined period that monitors and/or manages the process control system 100 of FIG. 1. The example control loop processor 706 of FIG. 7 can be implemented using a microprocessor, a microcontroller, an application specific integrated circuit (ASIC), a digital signal processor, etc.

The control loop processor 706 receives input signals originating from field devices, processes the input signals, calculates control actions, and generates output signals corresponding to the control actions. The control algorithm, routine, and/or the control loop may be specified by a control schedule. Additionally, modifications to the control algorithm, the routine, and/or the control loop may be made by a process control engineer via the workstation 102 and/or through direct access to the controller 104.

The control loop processor 706 receives input signals from the I/O scheduler 180. The I/O scheduler 180 sends input signals to the control loop processor 706 during scheduled time periods prior to the control loop calculating a control action using the input signals. Additionally or alternatively, the I/O scheduler 180 may send input signals to the control loop processor 706 upon a request from the control loop processor 706. Upon receiving the input signals, the control loop processor 706 processes the input signals by reading them into the appropriate portions of the control loop (e.g., control variables within the AI 210 of FIG. 2). The control loop then utilizes the data within the input signal during a calculation of a control action and generates an output signal corresponding to the control action. Upon generating the output signal, the control loop processor 706 transmits the output signal to an output signal transmitter 710.

To transmit output signals to the corresponding field devices, the example controller 104 of FIG. 7 includes the output signal transmitter 710. The field devices use the output signals to perform corrective actions to the process control system 100 to keep one or more processes within predefined criteria. The example output signal transmitter 710 manages the transmission of output signals to the I/O data acquisition module 190 and/or the I/O cards 132*a-b* and 134*a-b*. Upon receiving an output signal from the control loop processor 706, the output signal transmitter 710 converts the output signal into a format for transmission via a communication path 738 to the I/O data acquisition module 190. The example communication path 738 may be implemented by Ethernet, universal serial bus (USB), IEEE 1394, etc. Alternatively, the communication path 738 may be wirelessly communicatively coupled to the I/O data acquisition module 190 and/or any field device (e.g., the wireless field device 116*c*) and can be implemented by using a wireless communication medium (e.g., wireless Ethernet, IEEE-802.11, Wi-Fi®, Bluetooth®, etc.).

Prior to transmitting output signals, the output signal transmitter 710 may access a low-priority signal database 720 to determine a sequence for transmitting output signals. For example, in cases when the output signal transmitter 710 receives many output signals from the control loop processor 706, the output signal transmitter 710 may prioritize which output signals are transmitted to the corresponding field devices. For example, if the output transmitter 710 receives multiple output signals, the output transmitter 710 may access the low-priority signal database 720 to determine that output signals associated with the control loop may be transmitted first and output signals that are not associated with the control loop may be subsequently transmitted.

Additionally, in some examples, the I/O scheduler 180 may access the low-priority database 720 to determine which inputs to determine are received within a scheduled time period. Input signals that are determined to be low priority may be examined by the I/O scheduler 180 after higher priority input signals. Low priority input signals may include a monitored input included within a display and/or an input that is not associated with a control action and a high priority includes at least one of. Further, a high priority input includes an input from a field device that is associated with a control action. Also, a low priority output signal may include an output signal that is generated between relatively long periods of time The example low-priority signal database 720 may be implemented by EEPROM, RAM, ROM, and/or any other type of memory. The priority rankings for each of the output signals may be inferred by the configured period of the control loop and/or may be configured by a process control engineer via a communication path 736. The example communication path 736 may be implemented by Ethernet, universal serial bus (USB), IEEE 1394, etc. Alternatively, the communication path 736 may be wirelessly communicatively coupled to the workstation 102 and can be implemented by using a wireless communication medium (e.g., wireless Ethernet, IEEE-802.11, Wi-Fi®, Bluetooth®, etc.).

While an example manner of implementing the controller 104 is depicted in FIG. 7, one or more of the interfaces, data structures, elements, processes and/or devices illustrated in FIG. 7 may be combined, divided, rearranged, omitted, eliminated and/or implemented in any other way. For example, the example input signal receiver 702, the example system clock manager 704, the example control loop processor 706, the example signal adjustment processor 708, the example output signal transmitter 710, the example diagnostic generator 712, the example I/O scheduler 180, the example schedule database 722, and/or the example low-priority signal database 720 illustrated in FIG. 7 may be implemented separately and/or in any combination using, for example, machine-accessible or readable instructions executed by one or more computing devices and/or computing platforms (e.g., the example processing platform 1010 of FIG. 10).

Further, the example input signal receiver 702, the example system clock manager 704, the example control loop processor 706, the example signal adjustment processor 708, the example output signal transmitter 710, the example diagnostic generator 712, the example I/O scheduler 180, the example schedule database 722, the example low-priority signal database 720, and/or more generally, the controller 104 may be implemented by hardware, software, firmware and/or any combination of hardware, software and/or firmware. Thus, for example, any of the example input signal receiver 702, the example system clock manager 704, the example control loop processor 706, the example signal adjustment processor 708, the example output signal transmitter 710, the example diagnostic generator 712, the example I/O scheduler 180, the example schedule database 722, the example low-priority signal database 720, and/or more generally, the controller 104 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 8A:
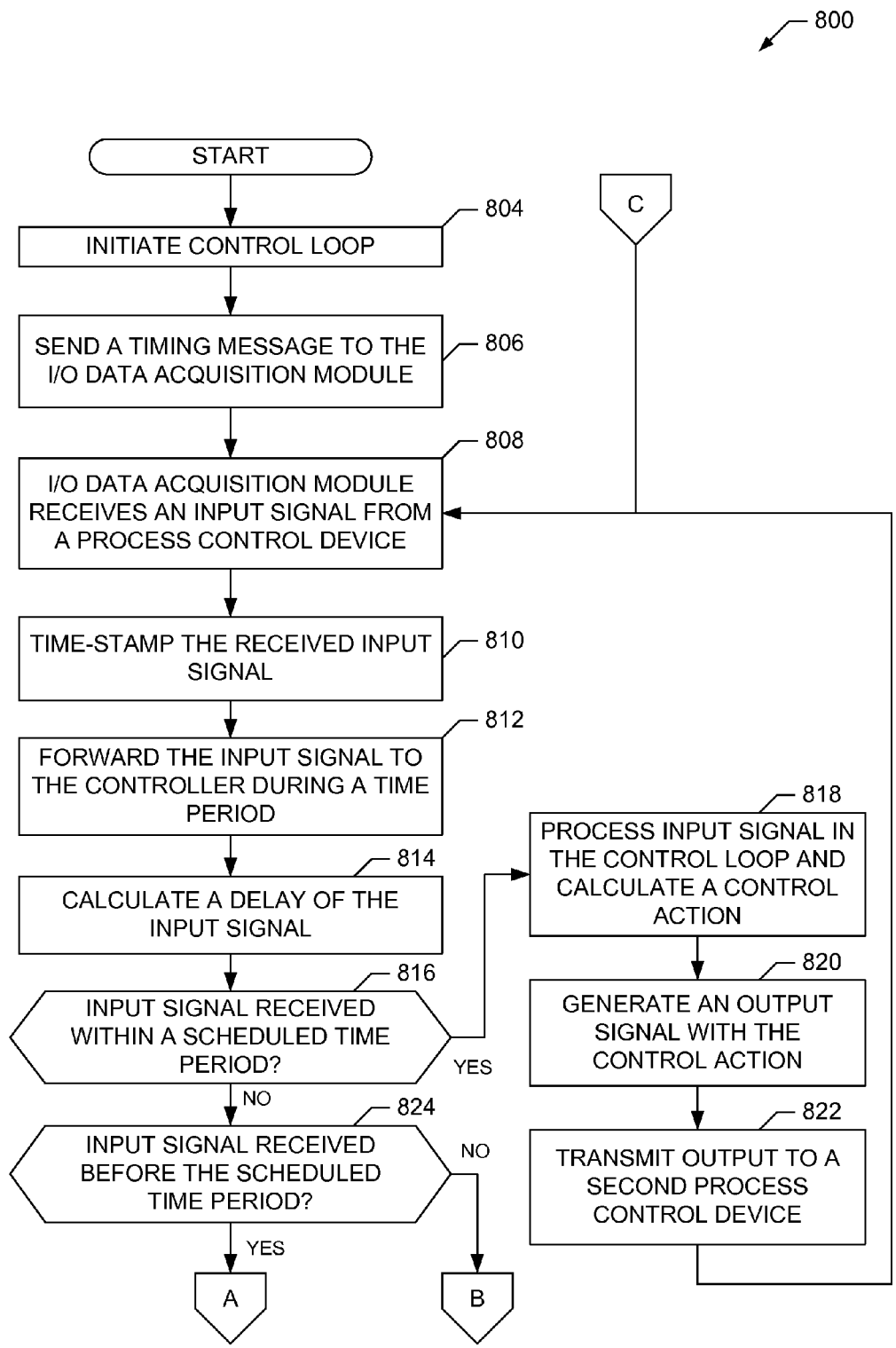
FIGS. 8A, 8B, and 9 are flowcharts of example methods that may be used to implement the example controller of FIGS. 1, 2 and 7, the example control loop of FIGS. 1 and 2 and/or an example I/O scheduler of FIGS. 1 and 2.
Figure 8B:
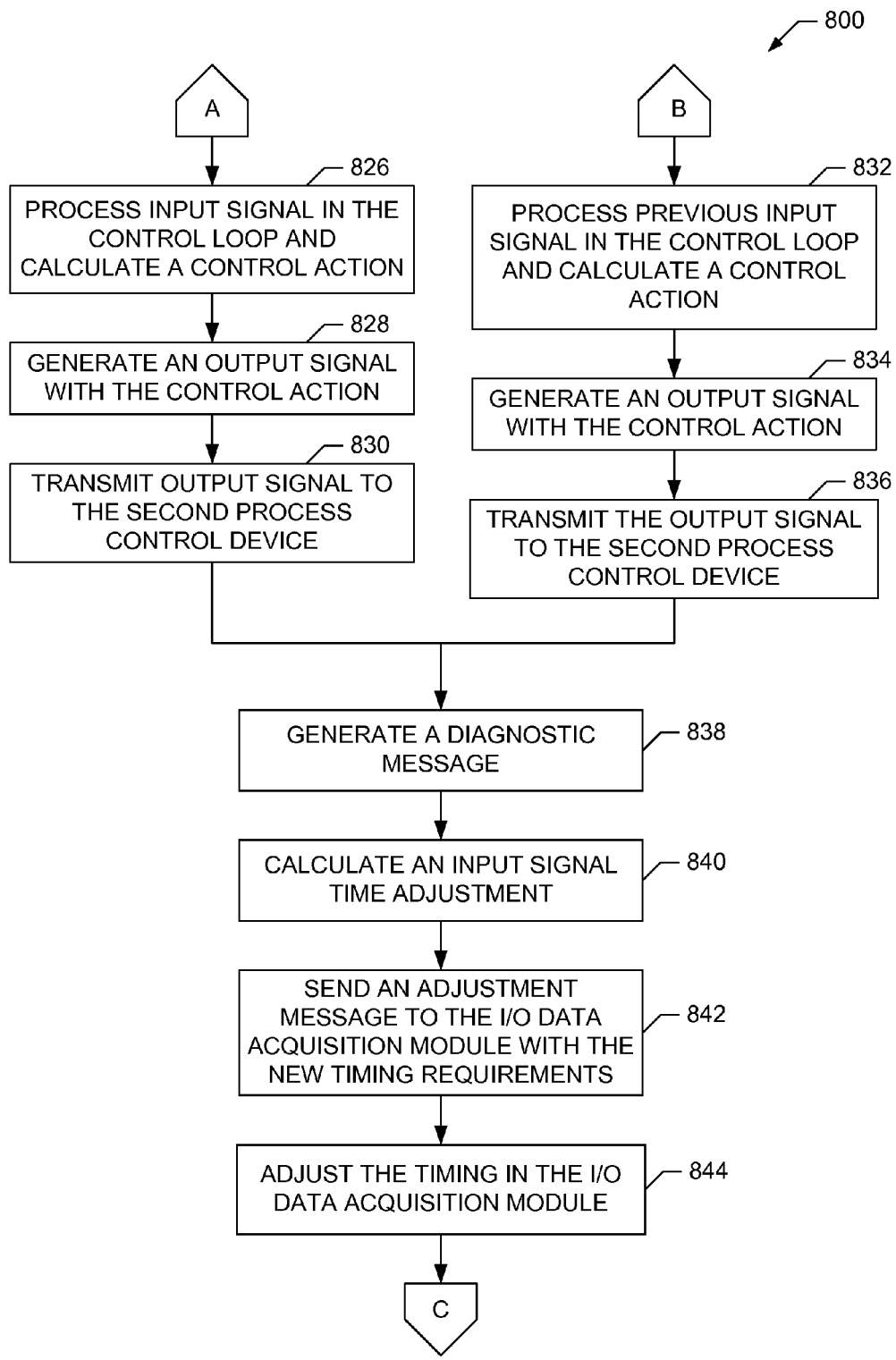
Figure 9:
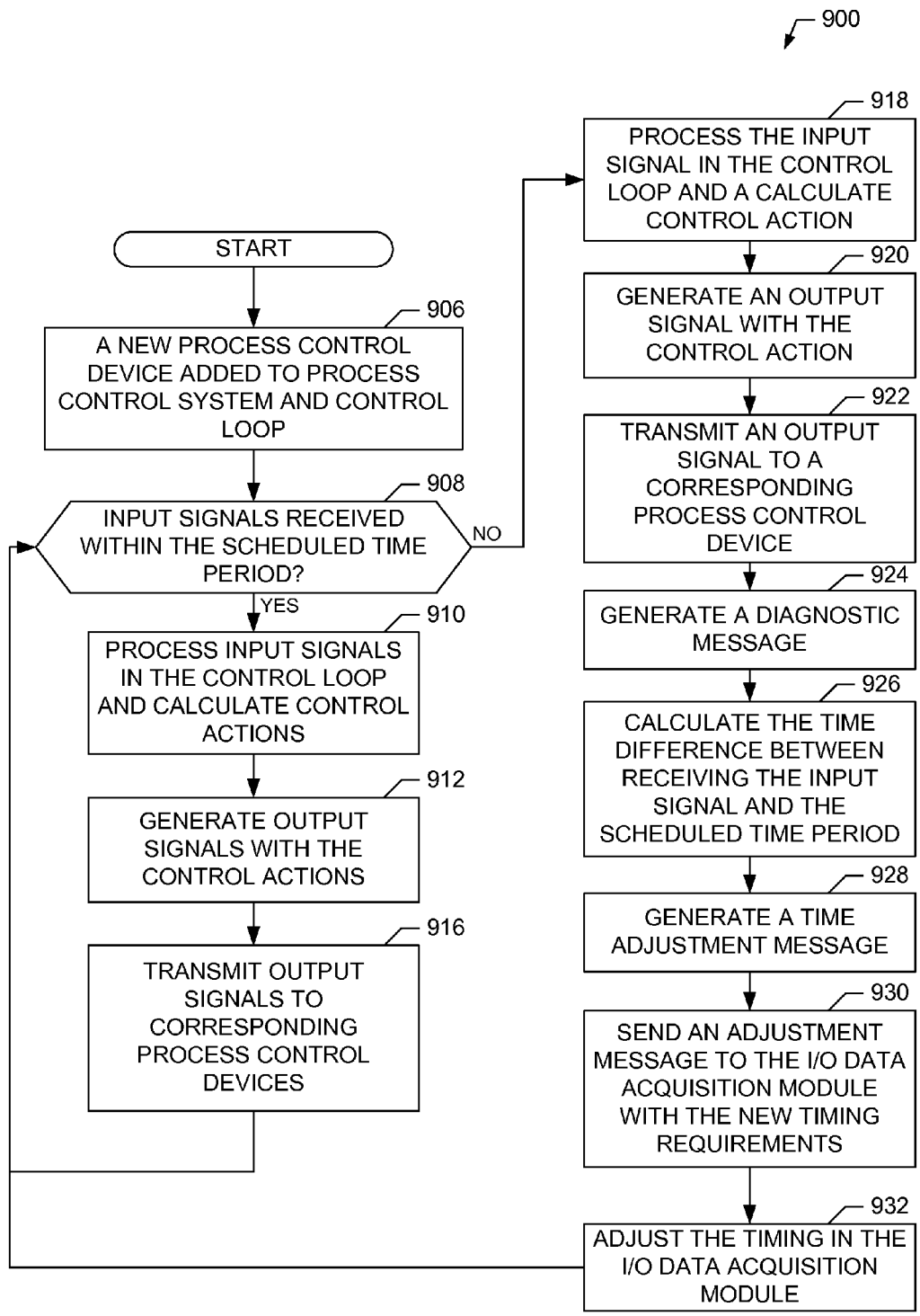

FIGS. 8A, 8B, and 9 are flowcharts of example methods that may be carried out to implement the example controller 104 of FIGS. 1, 2, and/or 7, the example I/O scheduler 180 of FIGS. 1, 2, and/or 7, the example I/O data acquisition module 190 of FIGS. 1 and/or 2, and/or the example process control system 100 of FIGS. 1 and/or 2. The example methods of FIGS. 8A, 8B, and 9 may be carried out by a processor, a controller and/or any other suitable processing device. For example, the example methods of FIGS. 8A, 8B, and 9 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform 1010 discussed below in connection with FIG. 10). Combinations of the above are also included within the scope of computer-readable media. Methods comprise, for example, instructions and/or data that cause a processor, a general-purpose computer, special-purpose computer, or a special-purpose processing machine to implement one or more particular methods. Alternatively, some or all of the example methods of FIGS. 8A, 8B, and 9 may be implemented using any combination(s) of ASIC(s), PLD(s), FPLD(s), discrete logic, hardware, firmware, etc. Also, some or all of the example methods of FIGS. 8A, 8B, and 9 may instead be implemented manually or as any combination of any of the foregoing techniques, for example, any combination of firmware, software, discrete logic and/or hardware. Further, many other methods of implementing the example operations of FIGS. 8A, 8B, and 9 may be employed. For example, the order of execution of the blocks may be changed, and/or one or more of the blocks described may be changed, eliminated, sub-divided, or combined. Additionally, any or all of the example methods of FIGS. 8A, 8B, and 9 may be carried out sequentially and/or carried out in parallel by, for example, separate processing threads, processors, devices, discrete logic, circuits, etc.

The example method 800 of FIGS. 8A and 8B provides an input signal verification and/or adjustment process to configure input signals so they are received by the controller 104 within a specified scheduled time period. The example method 800 provides a process for calculating a timing adjustment for input signals originating from one process control device (e.g., a field device). However, the example method 800 may operate in parallel with other example methods 800 for calculating a timing adjustment for input signals originating from a plurality of process control devices. Additionally, the example methods 800 may be at different blocks at different times for each of the process control devices.

The example method 800 begins in FIG. 8A when the example controller 104 of FIG. 1 initiates a control loop (block 804). The control loop may be included within a control algorithm and/or a routine operating within the controller 104. Next, the controller 104 sends an initial timing message to the I/O acquisition module 190 (block 806). The initial timing message includes the times for the I/O acquisition module 190 to forward input signals to the controller 104. The timing message may be based on a control schedule of the control loop. At some time, later the I/O acquisition module 190 receives a first input signal from a process control device (e.g., the field devices 112a-c and 116a-c) (block 808). Upon receiving the first input signal, the I/O acquisition module 190 time-stamps the received input signal (block 810). Then, during a scheduled time period corresponding to the time in the timing message, the I/O acquisition module 190 forwards the first input signal to the controller 104 (block 812).

The I/O scheduler 180 and/or the controller 104 receives the first input signal from the I/O acquisition module 190 and calculates if the first input signal was received within the scheduled time period (i.e., calculating the delay of the input signal) (block 814). If the first input signal was received by the controller 104 during a scheduled time period corresponding to a predetermined time at which the control loop utilizes the first input signal (block 816), the control loop processor 706 of FIG. 7 within the controller 104 processes the first input signal within the control loop and calculates a control action using the first input signal (block 818). Next, the control loop processor 706 generates an output signal including the calculated control action (block 820). The controller 104 then transmits the output signal to a second process control device to control a portion of the process control system 100 (block 822). The example method 800 of FIG. 8A then loops back as the I/O data acquisition module 190 receives another input signal from the process control device (block 808).

However, if the I/O scheduler 180 and/or the controller 104 determines the first input signal was received by the controller 104 outside of the scheduled time period corresponding to a time at which the control loop utilizes the first input signal (block 816), the I/O scheduler 180 and/or the controller 104 determines if the first input signal was received by the controller 104 before the start of the scheduled time period (block 824). If the first input signal was received before the scheduled time period, the example method 800 continues in FIG. 8B when the I/O scheduler 180 and/or the controller 104 forwards the first input signal to the control loop processor 706 and the control loop processor 706 processes and calculates a control action using the first input signal (block 826). The control loop processor 706 then generates an output signal from the control action (block 828) and transmits the output signal to the second process control device (block 830).

The example method 800 of FIG. 8B continues when the I/O scheduler 180 and/or the controller 104 generates a diagnostic message indicating the first input signal was received by the controller 104 prior to the start of the scheduled time period (block 838). The I/O scheduler 180 and/or the controller 104 then calculates the difference between the time at which the controller 104 received the first input signal and the scheduled time period (block 840). The I/O scheduler 180 and/or the controller 104 may calculate the difference between the time at which the controller 104 received the first input signal and a beginning, a middle, and/or an end of the scheduled time period. Alternatively, the I/O scheduler 180 and/or the controller 104 may calculate the difference between the time at which the controller 104 received the first input signal and any time within the scheduled time period.

In some example implementations, the I/O scheduler 180 and/or the controller 104 calculates the time difference (block 840) upon the input signal being sent to the control loop processor for processing (block 826). In yet other example implementations, the I/O scheduler 180 and/or the controller 104 may calculate the time difference (block 840) prior to the input signal being sent to the control loop processor for processing (block 826). The time difference may correspond to the difference between the time at which the first input signal was received and any time within the scheduled time period. The I/O scheduler 180 and/or the controller 104 generates a time adjustment message with the time difference (block 840) and transmits the timing adjustment message to the I/O data acquisition module 190 (bock 842). The timing adjustment message includes the new time for the I/O data acquisition module 190 to forward and/or request similar input signals originating from the same process control device reporting the same time of data as the first input signal.

In other example implementations, the I/O scheduler 180 and/or the controller 104 may calculate a time difference (block 840) based on an average time deviation from the scheduled time period of multiple received input signals. Then, if the average time deviation is outside the scheduled time period, the example controller 104 and/or the I/O data acquisition module may transmit the timing adjustment message to the I/O data acquisition module 190 (block 842). The average time deviation may be based on all input signals received from a field device or, alternatively, the time deviation may be based on a number of recently received input signals from a field device.

Upon receiving the timing adjustment message, the I/O data acquisition module 190 updates its timing schedule for inputs associated with the first input signal (block 844). Thus, any future input signals from the same process control device with the same type of information as the first input signals are forwarded by the I/O acquisition module 190 to the controller 104 at a time coinciding with the corresponding scheduled time period. Further, the I/O acquisition module 190 may request any future input signals from the same process control device with the same type of information as the first input signals based on the timing schedule. The example method 800 of FIG. 8B then loops back to FIG. 8A as the I/O data acquisition module 190 receives a second input signal from the process control device (block 808).

However, if the first input signal was received after the scheduled time period, the example method 800 continues in FIG. 8B when the control loop processor 706 processes and calculates a control action using a previous input signal received prior to the first input signal (block 832). Because the first input signal was received by the controller 104 after the calculation of the control action, the control loop can only utilize the available input signal, which was the previous input signal. The control loop processor 706 then generates an output signal from the control action (block 834) and transmits the output signal to the second process control device (block 836).

The example method 800 of FIG. 8B continues when the I/O scheduler 180 and/or the controller 104 generates a diagnostic message indicating the first input signal was received by the controller 104 after the start of the scheduled time period (block 838). The I/O scheduler 180 and/or the controller 104 then calculates the difference between the time at which the controller 104 received the first input signal and the scheduled time period (block 840). The time difference may correspond to the difference from any time within the scheduled time period to when the first input signal was received. The I/O scheduler 180 and/or the controller 104 generates a time adjustment message with the time difference (block 840) and transmits the timing adjustment message to the I/O data acquisition module 190 (bock 842). The timing adjustment message includes the new time for the I/O data acquisition module 190 to forward similar input signals originating from the same process control device reporting the same time of data as the first input signal. Further, the I/O acquisition module 190 may request future input signals from the same process control device with the same type of information as the first input signals based on the timing schedule.

Upon receiving the timing adjustment message, the I/O data acquisition module 190 updates its timing schedule for inputs associated with the first input signal (block 844). Thus, any future input signals from the same process control device with the same type of information as the first input signal are forwarded by the I/O acquisition module 190 to the controller 104 at a time coinciding with the corresponding scheduled time period. Further, the I/O acquisition module 190 may request future input signals from the same process control device with the same type of information as the first input signals based on the timing schedule. The example method 800 of FIG. 8B then loops back to FIG. 8A as the I/O data acquisition module 190 receives a second input signal from the process control device (block 808).

The example method 900 of FIG. 9 provides an input signal verification and/or adjustment process when a new process control device (e.g., a field device) is added to the process control system 100. The example method 900 may operate in parallel with other example methods 900 for calculating a timing adjustment for input signals originating from a plurality of process control devices. Additionally, the example methods 900 may be at different blocks at different times for each of the process control devices.

The example method 900 begins in FIG. 9 by a process control device being added to the process control system and the control loop being updated with a control action using an input from the newly added process control device (block 906). Next, the I/O scheduler 180 and/or the controller 104 determines if the input signals received from the field devices, including the newly added field device, are received within respective scheduled time periods (block 908). The I/O scheduler 180 and/or the controller 104 determines if each input signal is received during its corresponding scheduled time period as the I/O scheduler 180 receives the input signal. For the input signals that are determined to have been received during their respective scheduled time periods (block 908), the I/O scheduler 180 and/or the controller 104 forwards the input signals to the control loop processor 706. The control loop processor 706 then processes the input signals within the control loop and calculates corresponding control actions (block 910). From the control actions, the control loop processor 706 generates output signals (block 912) and transmits the output signals to the corresponding process control devices (block 916). The example method 900 of FIG. 9 then loops back to determine if the input signals received from the field devices, including the newly added field device, are received within respective scheduled time periods (block 908).

However, for each input signal that is received outside its respective scheduled time period (block 908), the I/O scheduler 180 and/or the controller 104 forwards the input signal to the control loop processor 706. In cases when the input signal is received before its scheduled time period, the control loop processor 706 processes the input signal within the control loop and calculates a corresponding control action (block 918). In cases when the input signal is received after the scheduled time period, the control processor 706 processes a previously received input signal within the control loop and calculates a corresponding control action (block 918). The control loop processor 706 then generates an output signal from the control action (block 920) and transmits the output signal to the corresponding process control device (block 922).

The example method 900 of FIG. 9 continues when the I/O scheduler 180 and/or the controller 104 generates a diagnostic message indicating the input signal was not received within its corresponding scheduled time period (block 924). The I/O scheduler 180 and/or the controller 104 then calculates the time difference between the time at which the controller 104 received the input signal and the corresponding scheduled time period (block 926). The I/O scheduler 180 and/or the controller 104 may calculate the difference between the time at which the controller 104 received the first input signal and a beginning, a middle, and/or an end of the scheduled time period. Alternatively, the I/O scheduler 180 and/or the controller 104 may calculate the difference between the time at which the controller 104 received the first input signal and any time within the scheduled time period. In some example implementations, the I/O scheduler 180 and/or the controller 104 calculates the time difference (block 926) upon the input signal being sent to the control loop processor for processing (block 918). In yet other example implementations, the I/O scheduler 180 and/or the controller 104 may calculate the time difference (block 926) prior to the input signal being sent to the control loop processor for processing (block 918). Additionally or alternatively, the I/O scheduler 180 and/or the controller 104 may generate a diagnostic message (block 924) upon calculating the time difference (block 926).

In other example implementations, the I/O scheduler 180 and/or the controller 104 may calculate a time difference (block 926) based on an average time deviation from the scheduled time period of multiple received input signals from the first and/or the second process control device. Then, if the average time deviation is outside the scheduled time period, the example controller 104 and/or the I/O data acquisition module may transmit the timing adjustment message to the I/O data acquisition module 190 (block 928). The average time deviation may be based on all input signals received from a field device or, alternatively, the time deviation may be based on a number of recently received input signals from a field device.

The I/O scheduler 180 and/or the controller 104 then generates a time adjustment message (block 928). The time adjustment message includes timing data such that subsequent input signals originating from the same process control device with the same type of information as the current input signal are received within the corresponding scheduled time period. The I/O scheduler 180 and/or the controller 104 then sends the time adjustment message to the I/O data acquisition module 190 (block 930). The I/O data acquisition module 190 receives the time adjustment message and adjusts the timing for forwarding input signals associated with the process control device that originated the untimely input signal (block 932). The example method 900 then loops back to determine if the input signals received from the field devices, including the newly added field device, are received within respective scheduled time periods (block 908).

Figure 10:
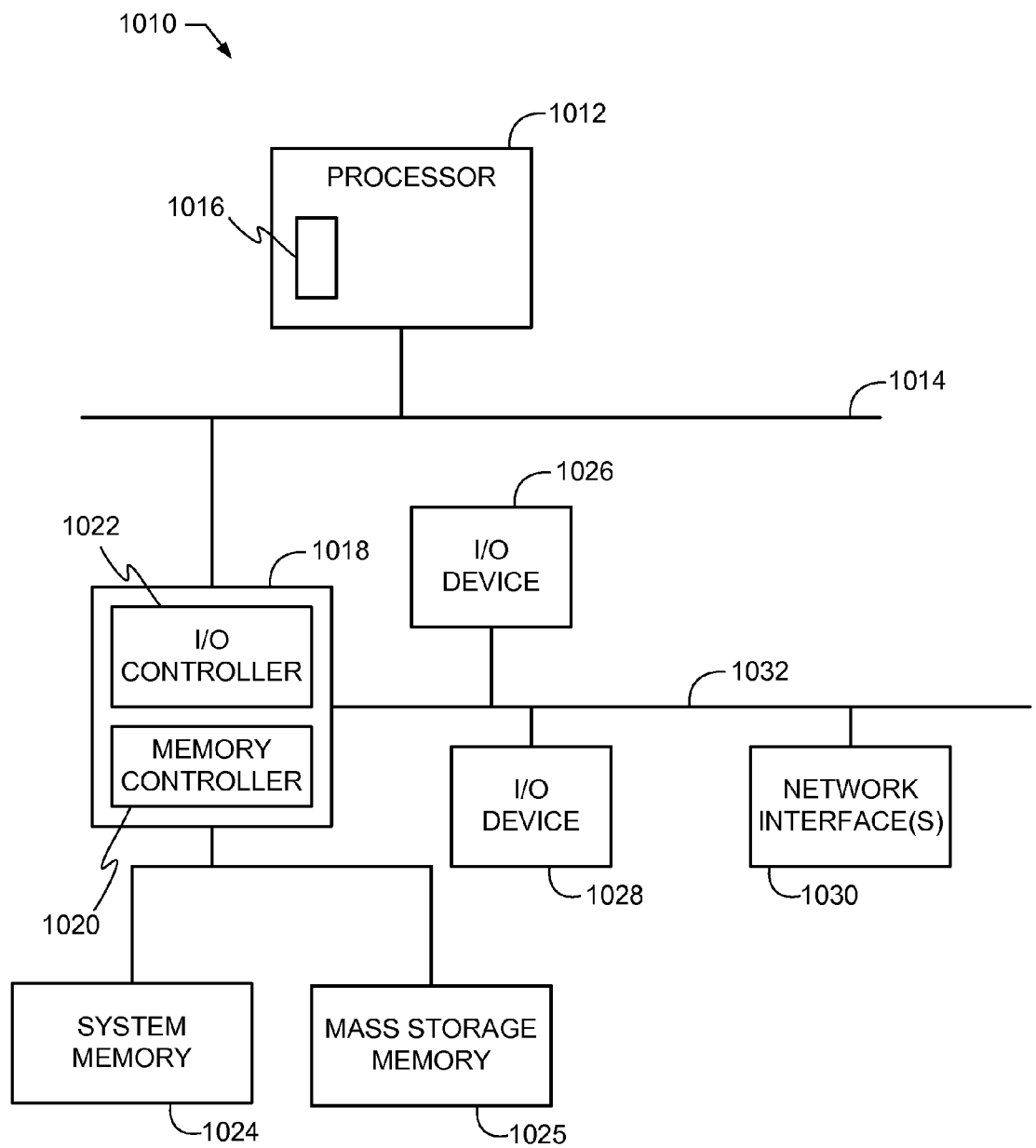
FIG. 10 is a block diagram of an example processor system that may be used to implement the example methods and apparatus described herein.

FIG. 10 is a block diagram of an example processor system 1010 that may be used to implement the example methods and apparatus described herein. For example, processor systems similar or identical to the example processor system 1010 may be used to implement the workstation 102, the controller 104, the I/O data acquisition module 190, and/or the I/O scheduler 180 of FIGS. 1 and/or 2. Although the example processor system 1010 is described below as including a plurality of peripherals, interfaces, chips, memories, etc., one or more of those elements may be omitted from other example processor systems used to implement one or more of the workstation 102, the controller 104, the I/O data acquisition module 190, and/or the I/O scheduler 180.

As shown in FIG. 10, the processor system 1010 includes a processor 1012 that is coupled to an interconnection bus 1014. The processor 1012 includes a register set or register space 1016, which is depicted in FIG. 10 as being entirely on-chip, but which could alternatively be located entirely or partially off-chip and directly coupled to the processor 1012 via dedicated electrical connections and/or via the interconnection bus 1014. The processor 1012 may be any suitable processor, processing unit or microprocessor. Although not shown in FIG. 10, the system 1010 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and a peripheral input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device. For example, if the example processor system 1010 is used to implement the workstation 102 (FIG. 1), the mass storage memory 1025 may include a hard disk drive, an optical drive, a tape storage device, etc. Alternatively, if the example processor system 1010 is used to implement the controller 104, the I/O data acquisition module 190, and/or the I/O scheduler 180, the mass storage memory 1025 may include a solid-state memory (e.g., a flash memory, a RAM memory, etc.), a magnetic memory (e.g., a hard drive), or any other memory suitable for mass storage in the controller 104, the I/O data acquisition module 190, and/or the I/O scheduler 180.

The peripheral I/O controller 1022 performs functions that enable the processor 1012 to communicate with peripheral input/output (I/O) devices 1026 and 1028 and a network interface 1030 via a peripheral I/O bus 1032. The I/O devices 1026 and 1028 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 1030 may be, for example, an Ethernet device, an asynchronous transfer mode (ATM) device, an 802.11 device, a DSL modem, a cable modem, a cellular modem, etc. that enables the processor system 1010 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

At least some of the above described example methods and/or systems are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to adjust control loop timing in a process control system, the method comprising:
   receiving a first input signal generated via a first process control device within a process control system, the first input signal being an input to a control loop;
   determining within the process control system if the first input signal is received during a first scheduled time period of the control loop; and
   adjusting within the process control system a timing of a subsequent input signal received from the first process control device to cause the subsequent input signal to be received during a subsequent scheduled time period of the control loop, the subsequent input signal being an input to the control loop and the timing of the subsequent input signal being based on at least when the first input signal was received.

2. A method as defined in claim 1, further comprising:
   prior to receiving the first input signal, specifying a first time corresponding to when the control loop utilizes information included within the first input signal;
   prior to receiving the first input signal, specifying a second time corresponding to when the control loop transmits an output signal associated with the first input signal; and
   upon receiving the first input signal, identifying a third time corresponding to when the first input signal was received.

3. A method as defined in claim 2, wherein the control loop, at the first time, calculates a control action based at least partially on information included within the first input signal.

4. A method as defined in claim 1, wherein the subsequent input signal is generated via the first process control device after the first input signal is generated.

5. A method as defined in claim 1, wherein the first input signal corresponds to a first cycle of the control loop and the subsequent input signal corresponds to a second cycle of the control loop.

6. A method as defined in claim 1, further comprising generating a diagnostic signal indicting the first input signal is outside of the first scheduled time period in response to determining the first input signal is received outside of the first scheduled time period.

7. A method as defined in claim 1, wherein determining if the first input signal is received during the first scheduled time period of the control loop includes calculating a time difference between when the first input signal was received and a time within the first scheduled time period.

8. A method as defined in claim 7, wherein the time within the first scheduled time period includes at least one of a start time of the first scheduled time period, an end time of the first scheduled time period, or a time between the start time and the end time of the first scheduled time period.

9. A method as defined in claim 1, wherein the timing of the subsequent input signal is based on determining an average of a first time difference and a second time.

10. A method as defined in claim 9, wherein the first time difference is based on a time difference between when the first input signal was received and a time within the first scheduled time period and the second time difference is based on a time difference between when a previous input signal was received and a time within a previous scheduled time period.

11. A method as defined in claim 1, wherein adjusting the timing of the subsequent input signal includes:
    incrementally adjusting a timing of an intermediate input signal received from the first process control device prior to receiving the subsequent input signal to cause the intermediate input signal to be received closer to an intermediate scheduled time period; and
    incrementally adjusting the timing of the subsequent input signal received from the first process control device to cause the subsequent input signal to be received during the subsequent scheduled time period.

12. A method as defined in claim 1, further comprising:
    time-stamping the first input signal during at least one of when the first input signal is generated by the first process control device or when the first input signal is received by a data acquisition device;
    calculating a time duration between when the first input signal is time-stamped and when the first input signal is received; and
    determining from the time duration a quality associated with a process control communication path from the first process control device to a controller receiving the first input signal.

13. A method as defined in claim 12, further comprising if the time duration exceeds a threshold:
    indicating the process control path communication has a latency;
    indicating the communication path has a quality issue; and
    generating a diagnostic message including at least one of the quality issue or the latency in the process control communication path.

14. A method as defined in claim 13, wherein the threshold includes a predetermined time for the first input signal to propagate from the first process control device to the controller.

15. A method to adjust control loop timing in a process control system, the method comprising:
    specifying a first time corresponding to when a control loop utilizes information included within a first input signal generated via a first process control device within a process control system, wherein the control loop, at the first time, calculates a control action based at least partially on information included within the first input signal;
    specifying a second time corresponding to when the control loop transmits an output signal associated with the first input signal; and
    identifying a third time corresponding to when the first input signal was received;
    determining within the process control system if the first input signal is received during a first scheduled time period of the control loop; and
    adjusting within the process control system a timing of a subsequent input signal received from the first process control device to cause the subsequent input signal to be received during a subsequent scheduled time period of the control loop, the timing of the subsequent input signal being based on at least when the first input signal was received;

determining a priority of at least one of the first input signal or the output signal;

if the priority is a high priority output signal, transmitting the control action via the output signal at the second time to at least one of the first process control device or a second process control device;

if the priority is a low priority output signal, transmitting the output signal after high priority outputs are transmitted to at least one of the first process control device or the second process control device;

if the priority is a high priority input signal, determining if the first input signal is received during the first scheduled time period of the control loop; and if the priority is a low priority input signal, determining if the first input signal is received during the first scheduled time period of the control loop after determining if other input signals are received during the first scheduled time period.

16. A method as defined in claim 15, wherein:

the low priority output signal includes an output signal that is generated between relatively long periods of time;

the high priority output signal includes the control action;

the low priority input signal includes at least one of a monitored input included within a display or an input that is not associated with the control action; and the high priority input signal includes an input from a field device that is associated with the control action.

17. An apparatus to adjust control loop timing in a process control system, the apparatus comprising a scheduler to:

determine if a first input signal originating from a first process control device is received during a first scheduled time period of a control loop, the first input signal being an input to the control loop; and adjust within the process control system a timing of a subsequent input signal received from the first process control device to cause the subsequent input signal to be received during a subsequent scheduled time period of the control loop, the subsequent input signal being an input to the control loop and the timing of the subsequent input signal being based on at least when the first input signal was received.

18. An apparatus as defined in claim 17, wherein the scheduler is to:

specify a first time corresponding to when the control loop utilizes information included within the first input signal;

specify a second time corresponding to when the control loop transmits an output signal associated with the first input signal;

upon receiving the first input signal, identify a third time corresponding to when the first input signal was received;

subtract the first time from the third time to determine whether the first input signal is received outside of the first scheduled time period; and adjust the timing of the subsequent input signal by sending a timing adjustment message.

19. An apparatus as defined in claim 18, further comprising:

a receiver to receive at least one of the first input signal or the subsequent input signal originating from the first process control device; and a control loop processor to:

operate the control loop;

at the first time, calculate a control action based at least partially on information included within the first input signal; and transmit at the second time the output signal including the control action to at least one of the first process control device or a second process control device.

20. An apparatus as defined in claim 19, wherein the control action includes an instruction to operate the second process control device to cause a change in a process associated with the process control system measured by the first process control device.

21. An apparatus as defined in claim 18, further comprising a data acquisition module to:

receive at least one of the first input signal or the subsequent input signal generated by the first process control device;

time-stamp the first input signal upon receiving the first input signal;

receive the output signal generated by the control loop processor and forward the output signal to at least one of the first process control device or a second process control device;

forward the first input signal to the scheduler during the first scheduled time period;

receive the timing adjustment message from the scheduler including an instruction to forward the second output signal to the receiver during the first scheduled time period of the control loop; and forward the subsequent input signal to the scheduler during the first scheduled time period of the control loop.

22. An apparatus as defined in claim 21, wherein the data acquisition module comprises an input/output card.

23. An apparatus as defined in claim 21, wherein at least one of the scheduler, the control loop processor, the data acquisition module, or the receiver is included within a controller.

24. An apparatus as defined in claim 21, wherein the scheduler is to:

calculate a time duration between when the first input signal is time-stamped by at least one of the data acquisition module or the first process control device and when the first input signal is received by the scheduler;

determine from the time duration a quality associated with a process control communication path from the first process control device to the scheduler;

indicate the process control path has a latency if the second time duration exceeds a threshold;

indicate the communication path has a quality issue; and generate a diagnostic message including at least one of the quality issue or the latency in the process control communication path.

25. An apparatus as defined in claim 17, wherein the scheduler is to determine if the first input signal is received during the first scheduled time period of the control loop by calculating a time difference between when the first input signal was received and a time within the first scheduled time period.

26. An apparatus as defined in claim 17, wherein the subsequent input signal is generated via the first process control device after the process control device generates the first input signal.

27. An apparatus as defined in claim 17, wherein the first input signal corresponds to a first cycle of the control loop and the subsequent input signal corresponds to a second cycle of the control loop.

28. An apparatus as defined in claim 17, wherein the scheduler is to determine the timing of the subsequent input signal by determining an average of a first time difference and a second time difference.

29. An apparatus as defined in claim 17, wherein the scheduler is to adjust the timing of the subsequent input signal by:
incrementally adjusting a timing of an intermediate input signal received from the first process control device prior to receiving the subsequent input signal to cause the intermediate input signal to be received closer to an intermediate scheduled time period; and
incrementally adjusting the timing of the subsequent input signal received from the first process control device to cause the subsequent input signal to be received during the subsequent scheduled time period.

30. An apparatus to adjust control loop timing in a process control system, the apparatus comprising a scheduler to:
determine if a first input signal originating from a first process control device is received during a first scheduled time period of a control loop; and
adjust within the process control system a timing of a subsequent input signal received from the first process control device to cause the subsequent input signal to be received during a subsequent scheduled time period of the control loop, wherein the timing of the subsequent input signal is based on at least when the first input signal was received;
determine a priority of at least one of the first input signal or the output signal;
if the priority is a high priority output signal, transmit the control action via the output signal at the second time to at least one of the first process control device or the second process control device;
if the priority is a low priority output signal, transmit the output signal after high priority outputs are transmitted to at least one of the first process control device or the second process control device;
if the priority is a high priority input signal, determine if the first input signal is received during the first scheduled time period of the control loop; and
if the priority is a low priority input signal, determine if the first input signal is received during the first scheduled time period of the control loop after determining if other input signals are received during the first scheduled time period.

31. A machine-accessible medium having instructions stored thereon that, when executed, cause a machine to:
determine within the process control system if first input signal generated via a first process control device within a process control system is received during a first scheduled time period of a control loop, the first input signal being an input to the control loop; and
adjust within the process control system a timing of a subsequent input signal received from the first process control device to cause the subsequent input signal to be received during a subsequent scheduled time period of the control loop, the subsequent input signal being an input to the control loop and the timing of the subsequent input signal being based on at least when the first input signal was received.

32. A machine-accessible medium as defined in claim 31, wherein the instructions, when executed, further cause the machine to:
prior to receiving the first input signal, specifying a first time corresponding to when the control loop utilizes information included within the first input signal;
prior to receiving the first input signal, specifying a second time corresponding to when the control loop transmits an output signal associated with the first input signal; and
upon receiving the first input signal, identifying a third time corresponding to when the first input signal was received.

33. A machine-accessible medium as defined in claim 32, wherein the control loop, at the first time, calculates a control action based at least partially on information included within the first input signal.

* * * * *